United States Patent
Rombakh

(10) Patent No.: US 11,047,813 B2
(45) Date of Patent: Jun. 29, 2021

(54) NON-INVASIVE MONITORING OF ATOMIC REACTIONS TO DETECT STRUCTURAL FAILURE

(71) Applicant: Volodymyr Pavlovich Rombakh, Edmonds, WA (US)

(72) Inventor: Volodymyr Pavlovich Rombakh, Edmonds, WA (US)

(*) Notice: Subject to any disclaimer, the term of this patent is extended or adjusted under 35 U.S.C. 154(b) by 0 days.

(21) Appl. No.: 16/418,257

(22) Filed: May 21, 2019

(65) Prior Publication Data
US 2020/0080948 A1    Mar. 12, 2020

Related U.S. Application Data

(60) Provisional application No. 62/674,107, filed on May 21, 2018.

(51) Int. Cl.
*G01N 23/22* (2018.01)
*G01V 5/00* (2006.01)
(Continued)

(52) U.S. Cl.
CPC ............ *G01N 23/22* (2013.01); *B61L 23/042* (2013.01); *B61L 27/04* (2013.01); *B64D 45/00* (2013.01);
(Continued)

(58) Field of Classification Search
CPC .... G01N 23/04; G01N 23/083; G01N 23/087; G01N 23/18; G01N 23/22; G01T 1/16;
(Continued)

(56) References Cited

U.S. PATENT DOCUMENTS

| 4,578,993 A | 4/1986 | Burandt |
| 4,862,004 A * | 8/1989 | Koike ................. G01T 1/40 250/369 |

(Continued)

FOREIGN PATENT DOCUMENTS

WO    2013142413 A2    9/2013

OTHER PUBLICATIONS

Ahmed, "Initiation and Growth of Multiple-Site Damage in the Riveted Lap Joint of a Curved Stiffened Fuselage Panel: An Experimental and Analytical Study," Doctoral Disseration, Drexel University, Mar. 2007, 328 pages.

(Continued)

*Primary Examiner* — Allen C. Ho
(74) *Attorney, Agent, or Firm* — Davis Wright Tremaine LLP

(57) ABSTRACT

The method and device to ensure the safety of people's life and health is based on the measurements of an intensity of spontaneous electromagnetic radiation caused by a deformation from a structure or a device, a nucleation and a growth of plant cells and living organisms; calculating an energy stored in a portion of a structure or cells based on the measured intensity; performing a comparison of the energy stored in the portion of the structure with a critical value for the structure and pathological changes in the cells; and indicate a potential failure of the structure or the level of pathological changes based on the performed comparison.

19 Claims, 26 Drawing Sheets
(20 of 26 Drawing Sheet(s) Filed in Color)

(51) Int. Cl.
| | |
|---|---|
| *B61L 23/04* | (2006.01) |
| *B61L 27/04* | (2006.01) |
| *B64D 45/00* | (2006.01) |
| *G01T 1/167* | (2006.01) |
| *G01T 1/16* | (2006.01) |
| *G01T 1/169* | (2006.01) |
| *G01N 23/083* | (2018.01) |
| *G01N 23/18* | (2018.01) |
| *G01N 23/04* | (2018.01) |
| *G01N 23/087* | (2018.01) |

(52) U.S. Cl.
CPC .......... *G01N 23/04* (2013.01); *G01N 23/083* (2013.01); *G01N 23/087* (2013.01); *G01N 23/18* (2013.01); *G01T 1/16* (2013.01); *G01T 1/167* (2013.01); *G01T 1/169* (2013.01); *G01V 5/00* (2013.01); *G01V 5/0008* (2013.01); *G01V 5/0075* (2013.01); *B64D 2045/0085* (2013.01); *G01N 2223/095* (2013.01)

(58) Field of Classification Search
CPC .......... G01T 1/167; G01T 1/169; G01V 5/00; G01V 5/0016; G01V 5/0041; G01V 5/0008; G01V 5/0075
USPC ........................................ 378/58, 98.9, 98.11
See application file for complete search history.

(56) References Cited

U.S. PATENT DOCUMENTS

| | | | | |
|---|---|---|---|---|
| 5,638,420 | A * | 6/1997 | Armistead | B66C 19/02 378/57 |
| 5,694,933 | A * | 12/1997 | Madden | A61B 6/4057 250/363.02 |
| 6,662,647 | B2 * | 12/2003 | Schoess | G01P 13/025 73/170.02 |
| 6,873,265 | B2 | 3/2005 | Bleier | |
| 6,888,917 | B2 * | 5/2005 | Sommer, Jr. | B07C 5/3427 378/44 |
| 7,050,535 | B2 | 5/2006 | Georgeson et al. | |
| 7,099,433 | B2 * | 8/2006 | Sommer | G01N 23/223 378/53 |
| 7,103,507 | B2 * | 9/2006 | Gorinevsky | G05B 23/0213 701/29.4 |
| 7,161,150 | B2 * | 1/2007 | Frankle | G01T 1/169 250/339.01 |
| 7,257,188 | B2 * | 8/2007 | Bjorkholm | G01T 3/00 378/53 |
| 7,312,460 | B2 * | 12/2007 | Gerl | G01T 1/169 250/393 |
| 7,564,943 | B2 * | 7/2009 | Sommer, Jr. | G01N 23/06 250/390.04 |
| 7,580,505 | B2 * | 8/2009 | Kang | A61B 6/4241 378/54 |
| 7,702,075 | B2 * | 4/2010 | Wang | G01N 23/087 378/98.9 |
| 7,839,969 | B2 * | 11/2010 | Gallup | G01N 23/223 378/45 |
| 7,912,177 | B2 * | 3/2011 | Naydenov | G01V 5/0041 378/53 |
| 8,023,619 | B2 * | 9/2011 | McNabb, Jr. | G01V 5/0016 378/106 |
| 8,290,120 | B2 * | 10/2012 | Bjorkholm | G01N 23/087 378/53 |
| 8,299,441 | B2 * | 10/2012 | Gueorguiev | G01V 5/0008 250/370.09 |
| 8,586,955 | B2 * | 11/2013 | Tay | G21F 3/00 250/515.1 |
| 8,779,370 | B2 * | 7/2014 | Reinhard | G06K 9/6247 250/370.06 |
| 9,012,852 | B2 * | 4/2015 | Pekarsky | G01V 5/0069 250/360.1 |
| 9,031,734 | B2 * | 5/2015 | Froom | G01M 5/0033 701/29.3 |
| 9,423,517 | B2 * | 8/2016 | Kang | G01T 7/005 |
| 9,442,212 | B2 * | 9/2016 | Yi | G01N 21/65 |
| 9,566,615 | B2 * | 2/2017 | Fujii | B07C 5/3416 |
| 9,696,266 | B2 * | 7/2017 | Suyama | G01N 23/083 |
| 10,031,261 | B2 * | 7/2018 | Deng | G01V 13/00 |
| 10,107,934 | B2 * | 10/2018 | De Vita | G01T 3/06 |
| 10,139,354 | B2 * | 11/2018 | Persson | A61B 6/5205 |
| 10,386,504 | B2 * | 8/2019 | Bendahan | G01V 5/0041 |
| 10,598,813 | B2 * | 3/2020 | Desaute | G01T 1/2978 |
| 10,795,049 | B2 * | 10/2020 | St-Aubin | G06T 7/50 |
| 10,859,516 | B2 * | 12/2020 | Ikeda | G01N 23/18 |
| 2002/0088277 | A1 | 7/2002 | Schoess et al. | |
| 2006/0069520 | A1 | 3/2006 | Gorinevsky et al. | |
| 2007/0290844 | A1 | 12/2007 | Colbert et al. | |
| 2009/0147913 | A1 | 6/2009 | Dragon et al. | |
| 2015/0134274 | A1 | 5/2015 | Froom et al. | |

OTHER PUBLICATIONS american-rails.com, "Defect Detection Cars, Searching for Unseen Rail Defects," Jul. 28, 2017, retrieved Aug. 26, 2019, retrieved from https://www.american-rails.com/defect.html, 5 pages.

Camara et al., "Correlation between nanosecond X-ray flashes and stic-slip friction in peeling tape," Nature 455 (7216):1089-92, Oct. 2008.

Chapetti et al., "Fatigue assessment of an electrical resistance welded oil pipeline," International Journal of Fatigue 24(1):21-8, Jan. 1, 2002.

Ertl, "Reaction at Surfaces: From Atoms to Complexity," Nobel Lecture, Dec. 8, 2007, 24 pages.

International Search Report and Written Opinion, dated Aug. 2, 2019, International Patent Application No. PCT/US2019/033392, filed May 21, 2019, 14 pages.

Maxwell, "Letter to William Thomson," The Scientific Letters & Papers of James Clerk Maxwell vol. I: 1846-1862, Dec. 18, 1856, 5 pages.

Maxwell, "On the Equilibrium of Elastic Solids," The Scientific Papers of James Clerk Maxwell, edited by W. D. Niven, 1850, 34 pages.

Mosinyi, "Aircraft Fuselage Damage Assessment In-Service Aircraft Fuselage Department," Doctoral Disseration, Drexel University, Oct. 2007, 423 pages.

Petrakovic H, "The Biofield Without Secrets: Collection of scientific papers," Encyclopedia of Russian Thought vol. 10, ISBN 5-85617-010-5, 2009.

Rombakh, "Atom Parameters and Metal Properties," Logistics Capital, Inc. Edmonds WA, USA, Feb. 12, 2008, 312 pages.

Rombakh, "Damage of Metals: Atomic Nature," International Conference on Fatigue Damage of Structural Materials V, Poster No. 1, 2004, 2 pages.

US Department of Transportation, Federal Railroad Administration, Office of Railroad Safety, Track Inspector Rail Defect Reference Manual, Jul. 2015, Revision 2, 87 pages.

Nang et al., "In-situ SEM observation of phase transformation and twinning mechanisms in an interstitial high-entropy alloy," Acta Materialia 147(1):236-246, Apr. 1, 2018.

Xu et al, "Automatic X-ray Crack Inspection for Aircraft Wing Fastener Holes," 2nd International Symposium on NDT in Aerospace—Mo.5.A.4, Nov. 2010.

Zuang et al., "Prediction of Fatigue Crack Growth from Bolt Holes in a Titanium Disc," ICAS-98-5, 2, 3, A98-3 I 62, Sep. 13, 1998.

* cited by examiner

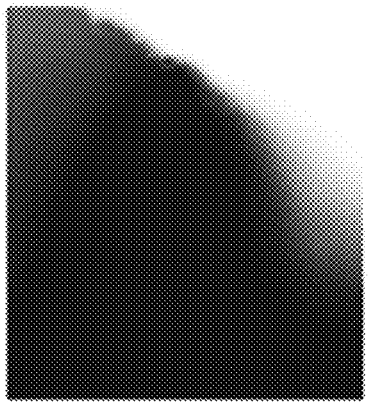
FIG. 1C
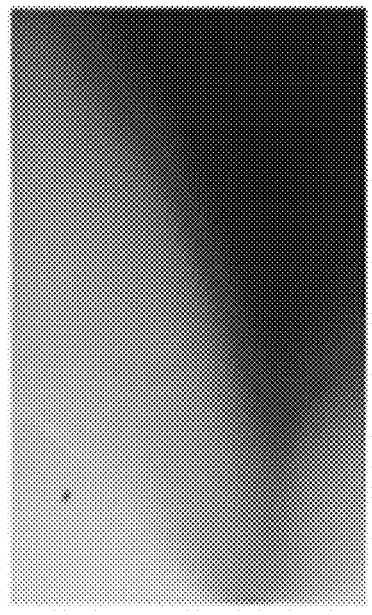
FIG. 1B
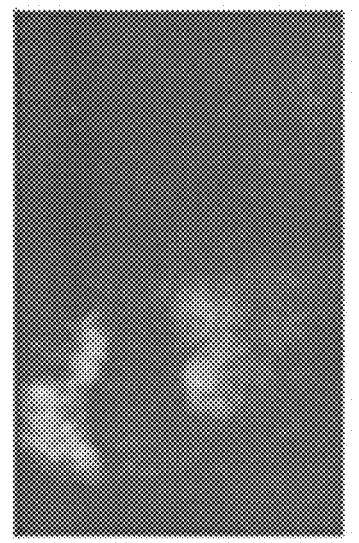
FIG. 1A
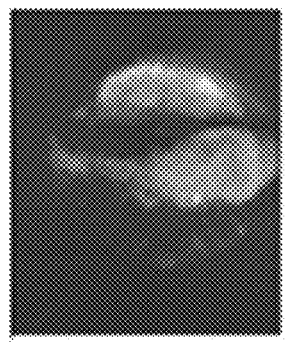
FIG. 1H
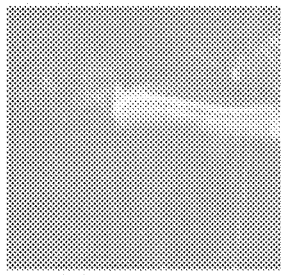
FIG. 1I
FIG. 1G
FIG. 1F
FIG. 1E
FIG. 1D

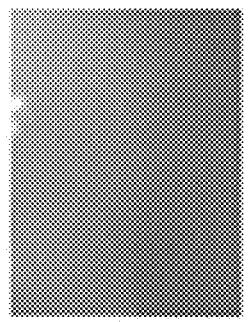
FIG. 2D
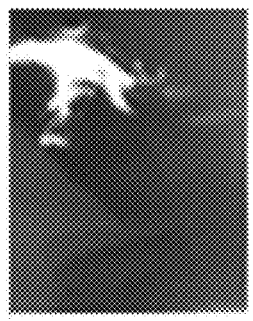
FIG. 2H
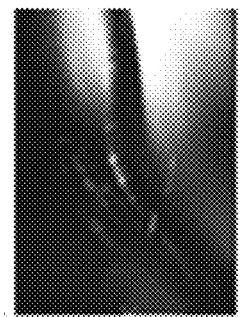
FIG. 2L
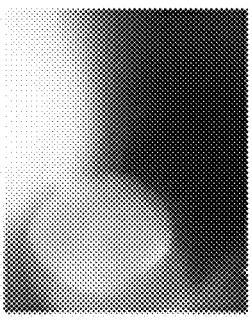
FIG. 2P
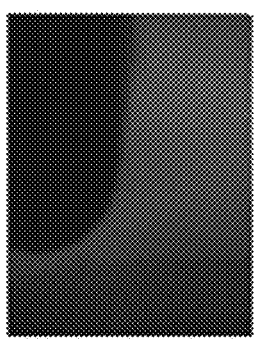
FIG. 2C
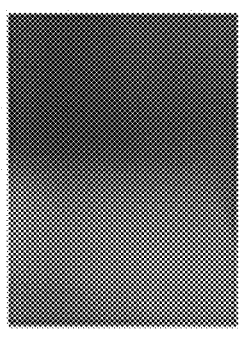
FIG. 2G
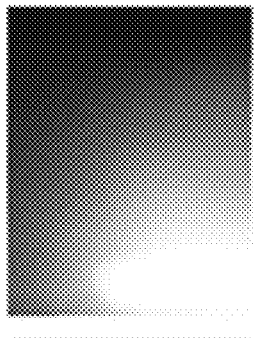
FIG. 2K
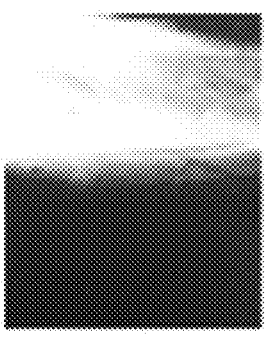
FIG. 2O
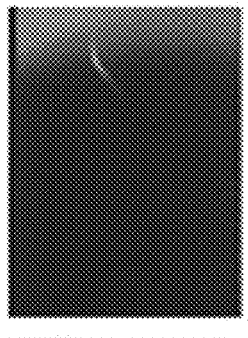
FIG. 2B
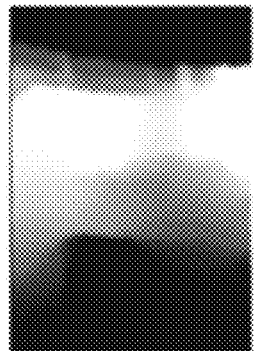
FIG. 2F
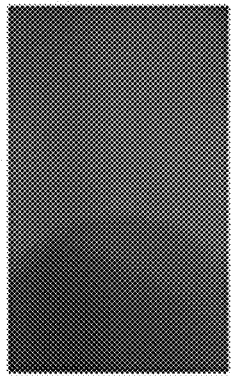
FIG. 2J
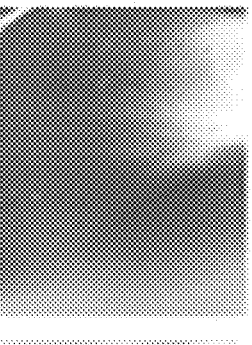
FIG. 2N
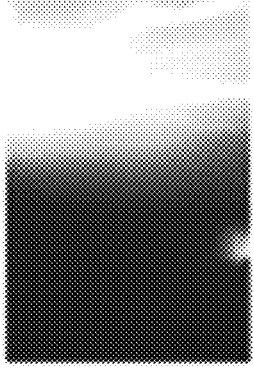
FIG. 2A
FIG. 2E
FIG. 2I
FIG. 2M

FIG. 6G

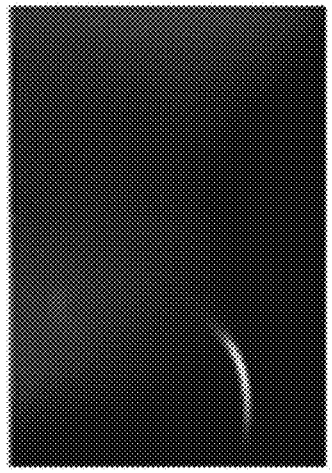
FIG. 7C
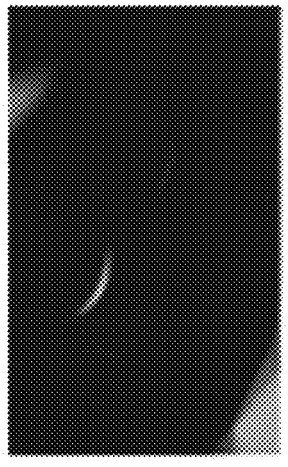
FIG. 7F
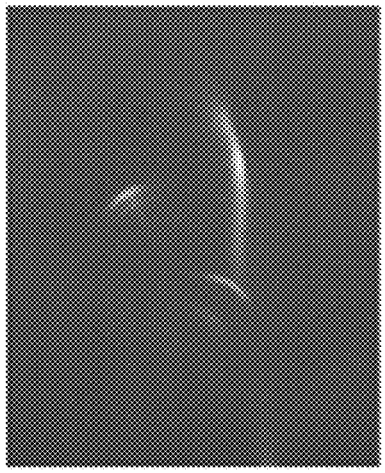
FIG. 7I
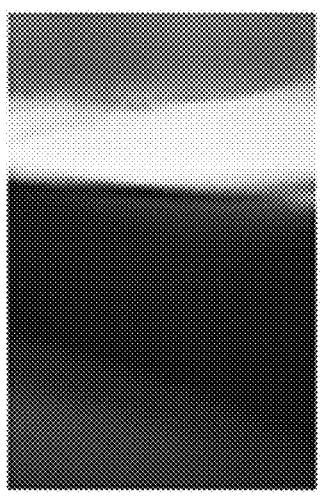
FIG. 7B
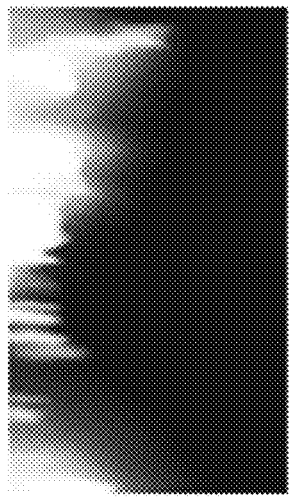
FIG. 7E
FIG. 7H
FIG. 7A
FIG. 7D
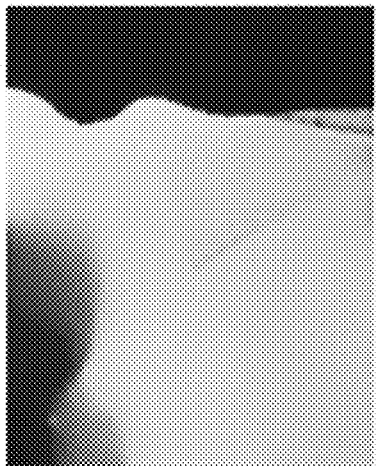
FIG. 7G

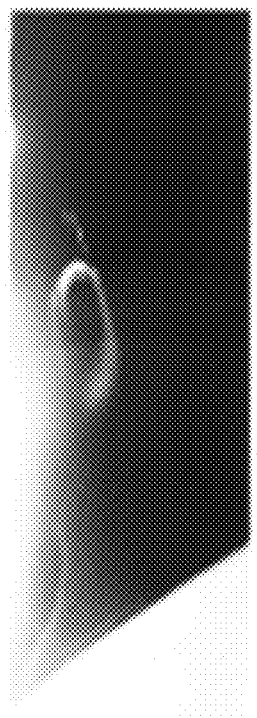
FIG. 11A / FIG. 11B
FIG. 11C / FIG. 11D / FIG. 11E / FIG. 11F
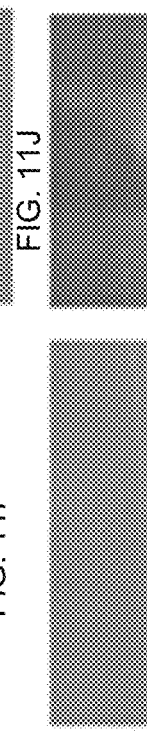
FIG. 11G / FIG. 11H / FIG. 11I / FIG. 11J
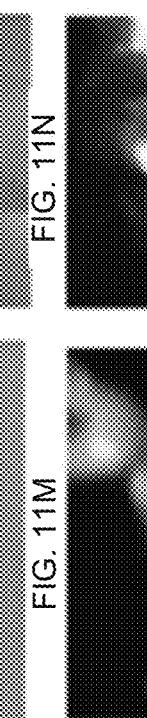
FIG. 11K / FIG. 11L / FIG. 11M / FIG. 11N
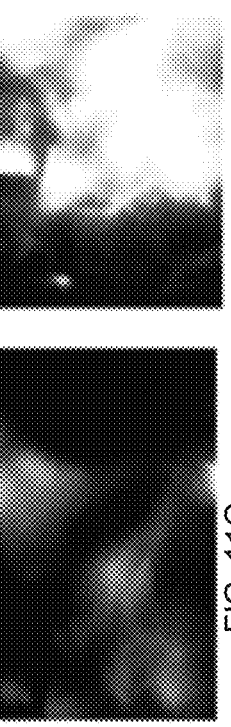
FIG. 11O / FIG. 11P / FIG. 11Q / FIG. 11R

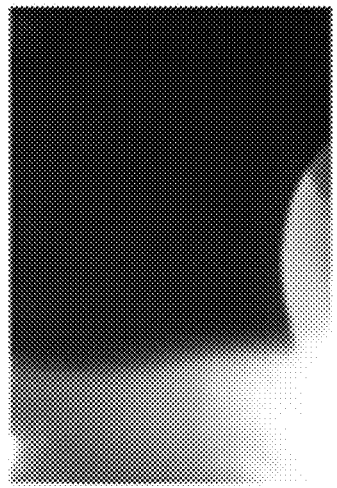
FIG. 13C
FIG. 13F
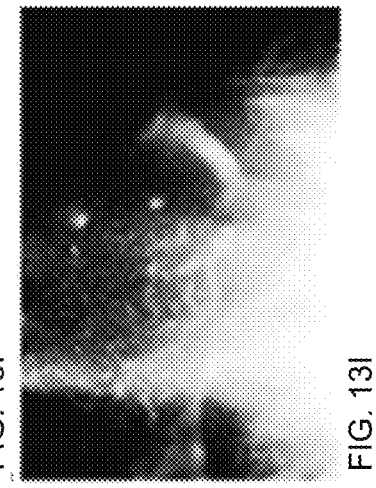
FIG. 13I
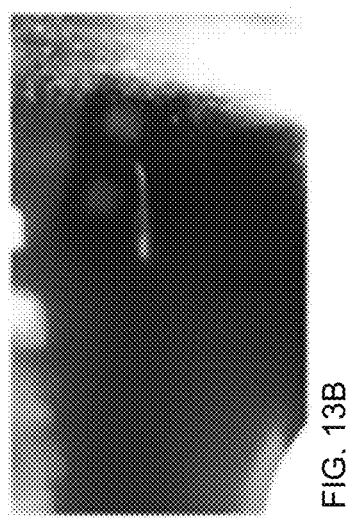
FIG. 13B
FIG. 13E
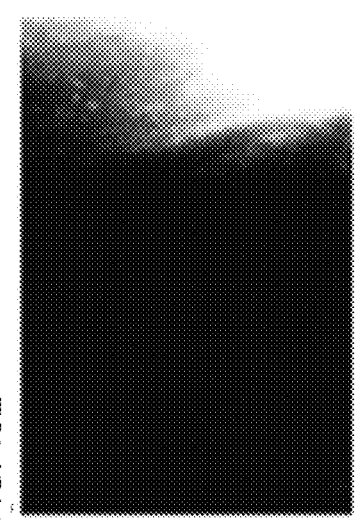
FIG. 13H
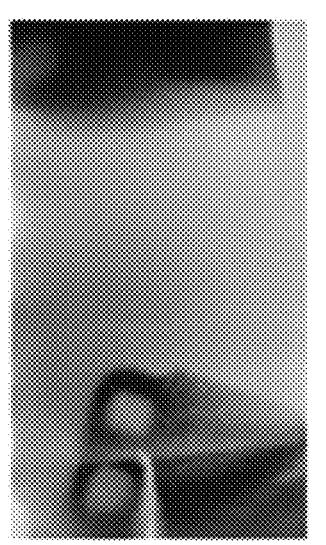
FIG. 13A
FIG. 13D
FIG. 13G

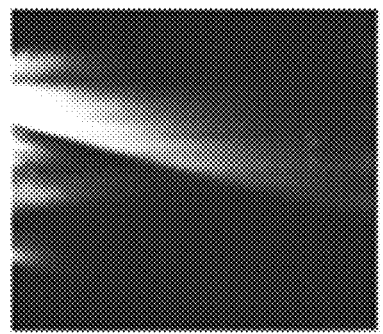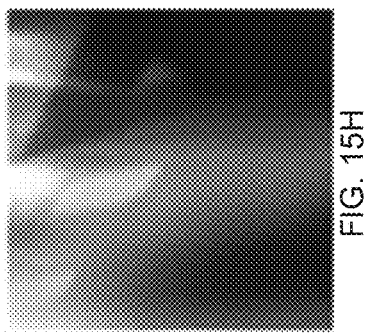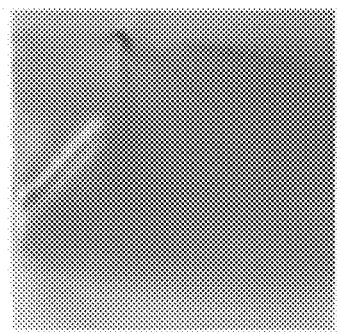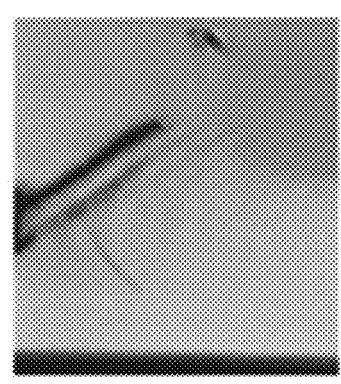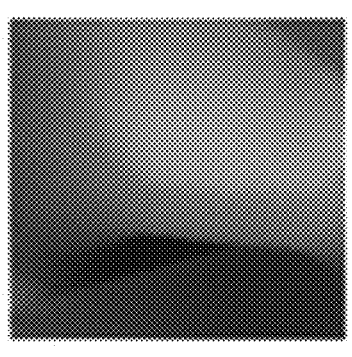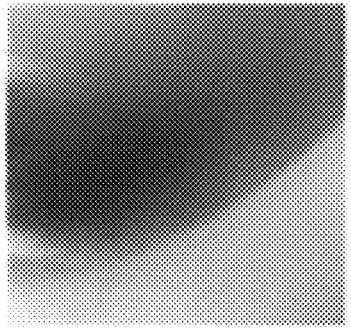

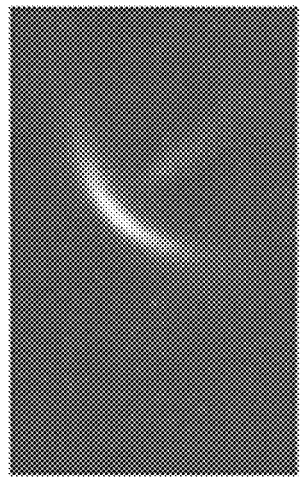
FIG. 16C
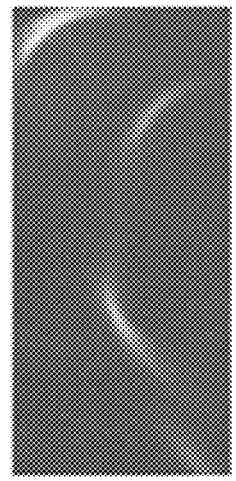
FIG. 16F
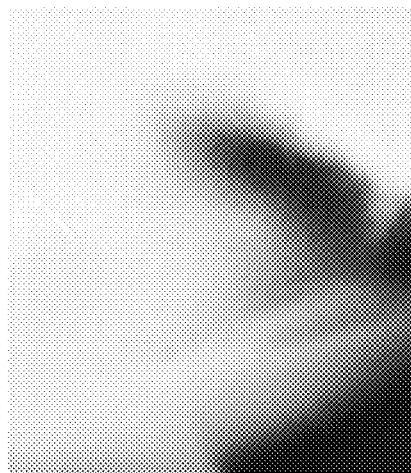
FIG. 16H
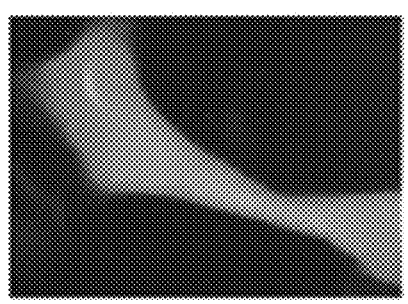
FIG. 16B
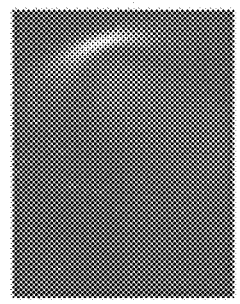
FIG. 16E
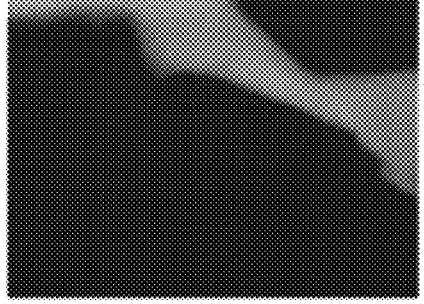
FIG. 16H
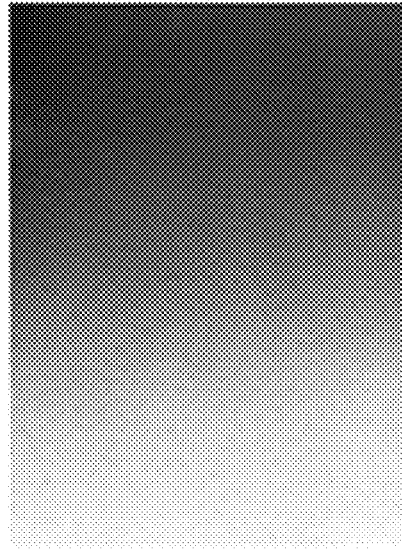
FIG. 16A
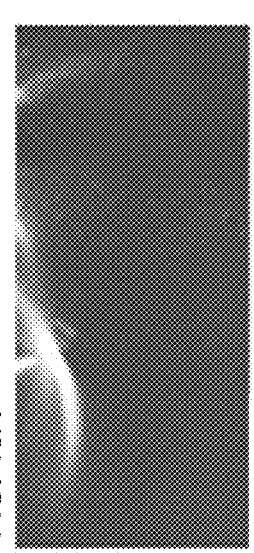
FIG. 16D
FIG. 16G

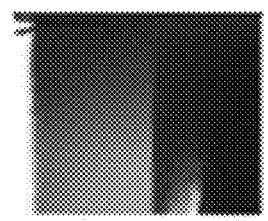 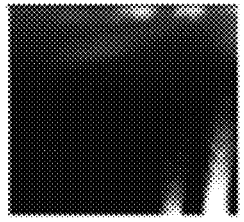 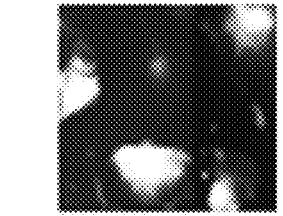 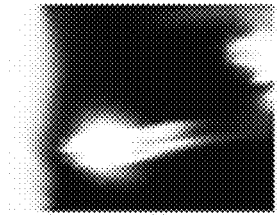
FIG. 19A  FIG. 19B     FIG. 19C     FIG. 19D  FIG. 19E     FIG. 19F
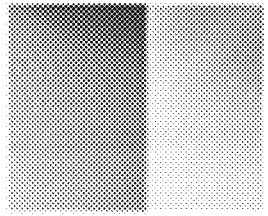 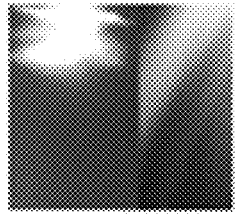 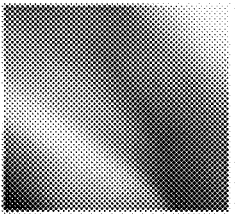 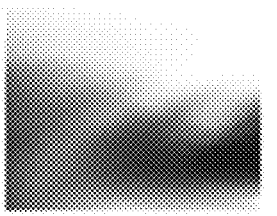
FIG. 19G  FIG. 19H     FIG. 19I  FIG. 19J     FIG. 19K     FIG. 19L
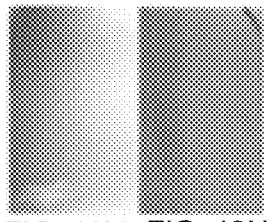 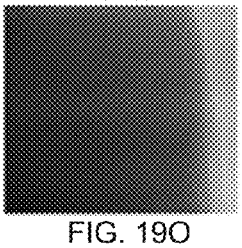 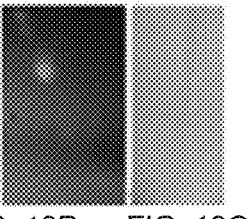 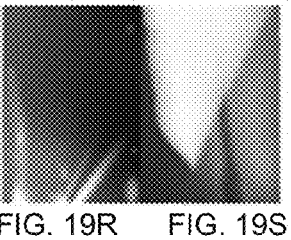
FIG. 19M  FIG. 19N     FIG. 19O     FIG. 19P  FIG. 19Q     FIG. 19R  FIG. 19S
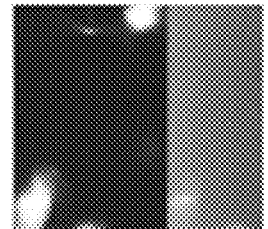 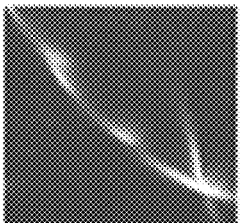 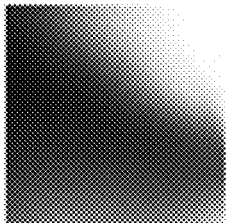 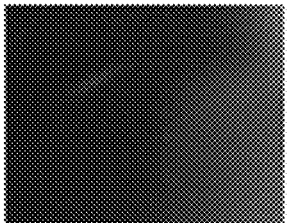
FIG. 19T  FIG. 19U     FIG. 19V     FIG. 19W     FIG. 19X

FIG. 25

NON-INVASIVE MONITORING OF ATOMIC REACTIONS TO DETECT STRUCTURAL FAILURE

CROSS-REFERENCE TO RELATED APPLICATION

This application claims priority to and incorporates by reference for all purposes the full disclosure of U.S. Provisional Patent Application No. 62/674,107, filed May 21, 2018, entitled "METHOD AND SYSTEM FOR NON-DESTRUCTIVE REMOTE MONITORING THE WEAR OF STRUCTURES AND DEVICES."

FIELD

The present disclosure relates to embodiments to ensure the safety of life and human activity on natural and man-made objects, regardless of their size, shape, composition, purpose and nature of external influences. This goal is achieved by the possibility of experimental continuous or periodic monitoring the energy of dynamic processes due to the atomic reaction, and accessing its magnitude using equations, in order to stop operation before the accumulated energy reaches a critical value. Electromagnetic, including X-ray, radiation accompanying atomic reactions in inorganic and organic objects is used to analyze the processes of wear and aging.

An experimental study carried out by the inventor showed that the method based on the analysis of atomic reactions is applicable in all areas of human activity. Analysis of atomic reactions leading to wear, aging, destruction of structures and devices; aging, pathological changes and death of plants and organs of a living organism are performed in the invention from the standpoint of quantum electrodynamics, which is an accurate physical theory that ensured the development of natural science, technology and medicine.

BACKGROUND

Numerous structures in various contexts are relied upon for the safety of individuals, not to mention for other reasons. For example, people in an airplane rely on the integrity of the structures that make up the airplane. People crossing a bridge by car, truck, or other vehicle rely on the structural integrity of the bridge. Rail passengers rely on the integrity of the rails and structures that make up the trains on which they ride. Despite efforts to prevent structural failure, structures nevertheless do fail, too often resulting in injury and death. Prediction of structural failure has proven to be a difficult problem. Cracks in structures can be difficult to detect and often appear without warning after normal or even abnormal use.

DETAILED DESCRIPTION

The experimental basis of the invention is the next use of an electromagnetic impulse for practical purposes. The number of such applications is huge. They cover almost all modern technical devices that people use. The first use was found by a primitive man, when, striking a piece of iron with a flint, he extracted a spark and lit a fire, repeating a natural phenomenon called lightning. Consequently, impact and friction give rise to electromagnetic impulse.

A lightning rod, invented by B. Franklin, was used as the second example of the use of a spark. The utility of this invention lies in the fact that the lightning rod increases the rate of energy dissipation in a thundercloud, the accumulation of which is caused by the impact (friction) of ice crystals.

The amplification of an electromagnetic pulse in a laser is due to the fact that in the process of pumping the accumulation rate exceeds the rate of energy dissipation. Energy accumulation is due to the fact that some of the atoms, having absorbed energy, moved to a higher energy level and do not emit it during a certain time interval, which is called the lifetime of the metastable state.

If there are more atoms at the metastable level than at the bottom, then a random pulse emitted by one atom, called a photon, can stimulate the emission of other atoms in the same direction, with the same energy, phase and polarization. The energy of such photons is summed.

Such a phenomenon, called stimulated or induced radiation, has no analogs beyond the limits of quantum systems.

The theoretical basis of the method proposed in the invention is the inventor's hypothesis that the loss of integrity of a solid, i.e. the formation of pores, cracks and destruction is due to the formation of local regions of metastable atoms, the stimulated emission of which, being absorbed by other atoms, is sufficient to break the bond between these atoms. Such a local group of atoms is called a destruction domain.

The transition of atoms from the normal to the metastable state is due to the absorption of photons, the birth of which occurs as a result of the transformation of the mechanical energy of deformation into the electromagnetic one.

All dynamic processes are initially due to the interaction of atoms, which are attracted to each other, but repel at some distance because the charges of all atomic nuclei are positive and the electron shells are negative. Dynamic equilibrium occurs when the forces of attraction are equal to repulsive forces.

It is proved that all processes in nature are caused by four types of interaction: strong, which is taken as 1; electromagnetic equal to $1/137$; weak, equal to $1/10^{12}$ and gravitational, equal to $1/10^{40}$. Mechanical interaction in nature is absent not only between individual atoms, but also macroscopic bodies. This seemingly paradoxical conclusion is due to the fact that a layer of electrons with a thickness of up to two nanometers is formed above the surface of a solid. The convergence of bodies at this distance is accompanied by a change in the electric field and the appearance of a varying magnetic field. These two fields propagate in the form of an electromagnetic wave (photon).

The glow of two bodies caused by friction, called triboluminescence, serves to confirm this mechanism. This means that we can limit ourselves on the Earth by electromagnetic interaction in the analysis of dynamic processes.

Dynamic processes caused by atomic reactions provide for the safe operation of elements of structures and devices until changes occur in them, called fatigue, wear, or aging.

The term "fatigue" was introduced in 1839, it was widely used after Wohler's work, published in 1860-1870. This term and the method of constructing S-N curves are still used both in State Standards and in scientific research.

This term cannot be considered a physical parameter, since for 150 years the quantitative value of fatigue and the method of its measurement have not been proposed.

Modern mechanics of strength and destruction are based on the hypothesis that damage to materials, such as fatigue cracks, is due to the emission of elastic energy accumulated in stress concentrators. The main parameter of the equations proposed for the analysis of the experimental results is the stress intensity factor (SIF), $K=\sigma\sqrt{m}$.

The dimension of this parameter in the International System of Units Pam$^{1/2}$.

Currently, a number of methods and computer programs are used, the main parameters of which are stress intensity factors, for example, NASGRO, AFGROW, FRANC2D. The disadvantage of the experiment designed to implement these methods is its low efficiency. The analysis of such methods is performed using for example of AFGROW Release 5.03.03.23, which was used to study the causes of cracking in the fuselage. The fuselage panels were deformed with a period of 25-30 seconds. The total number of cyclic tests for each of the nine panels ranged from 2.5 to 4.3 million. Therefore, the experiment was lasted 730 working weeks. The crack of length 1925 mm was formed in one of the panels, but forecasting the time and place of cracking by these methods is impossible, since the equations do not contain time as a parameter and damage is detected after hundreds of hours.

$$\frac{da}{dN} = C\Delta K^n,$$

Consider as an example the Paris-Erdogan equation where da is the elongation of the crack, dN is the increase in the number of test cycles, the C-coefficient of proportionality, which has the dimension m/cycle, K is the stress intensity factor, $\Delta K = K_{max} - K_{min}$.

N is the exponent. The NASGRO equation reduces to the Paris-Erdogan equation. Analysis of this equation is necessary to show the errors they contain.

The left side of the equation, called the crack growth rate, has the same dimension as C. Consequently, the dimensions of the left and right sides are different.

Analysis of the causes of crack formation, 4.8 m long, in the oil pipeline [See: M. D. Chapetti, at al., Int. J. of Fatigue, (2002), 24, 21-28] was performed using the Paris-Erdogan equation. The authors gave one of the solutions: n=6, C=3.818.10$^{-15}$ m/cycle, which contains gross errors: the cycle in which the elongation of the crack corresponds to the size of the atomic nucleus is meaningless, as is the measurement of length with an accuracy of 10$^{-18}$ meters. But there are many such examples.

The NASGRO equation, which differs from the Paris-Erdogan equation only by a numerical factor, contains the same errors.

The gross errors of the modern theory of strength and destruction are associated with the neglect of the achievements of quantum theory, on the basis of which electron and atomic force microscopes, diffractometers, and field ion microscopes are created. The authors of the articles, using them, try to describe from the point of view of classical mechanics the results obtained using, for example, the electron backscattering effect.

The inventor's hypothesis and the method based on it is a quantum-mechanical interpretation of the idea of D. K. Maxwell that the potential deformation energy U is equal to the sum of two energies:

$$U = U_1 + U_2 \qquad (1),$$

where $U_1$ it is caused by symmetric compression and $U_2$ is caused by distortion without compressions. [See: J. C Maxwell, Letter to William Thomson, 18 Dec. 1856, The Scientific Letters &Papers of James Clerk Maxwell, v. 1, 1846-1862, 487-491.]

Equation (1) forms the basis of the modern energy theory of strength. The energy $U_2$, the radiation of which leads to destruction, is considered in this theory as elastic energy, is stored in stress concentrators.

Description of the Experimental Research

The emission of electrons and X-rays during the destruction of the adhesive layer and the separation of thin films was observed repeatedly [See: V. V. Karasev et al. DAN USSR, (1953), 88, 777-78; C. G. Camara et al., Nature, (2008) 455, 1089-1092]. It was assumed that the emission of X-rays was caused by discharge in gases.

The inventor's hypothesis is that X-rays are the cause of the damage and the consequence. Such a conclusion seems paradoxical, but only from the standpoint of classical mechanics. It is due to the quantum nature of electromagnetic waves and the wave properties of electrons.

The deformation of compression, tension, bending, torsion of the samples and their destruction was carried out on a special device made on the basis of a vice. Shear deformation and destruction of the samples was carried out when drilling or putting the sample with a rotating grindstone. In all cases, at room temperature and liquid nitrogen temperature, both direct and fragmental radiation from destruction was recorded.

A KODAK 400 color film or FUJIFILM SUPERIA X-TRA 400 color film was placed in a container that was opaque to visible and ultraviolet rays. The container was irradiated with a stream of particles that were caught by a sticky film located on its surface. The frames were diaphragmed using lead tiles ⅔" thick (16.3 mm). A stream of particles from glass, alloys of iron, copper, aluminum, and zinc is directed above the surface of the container or outside of it to study direct electromagnetic radiation at the moment of destruction.

The absorption of electromagnetic radiation and luminescence was investigated using screens located on the surface of the container (FIGS. 1H, 1I, 2F, 2J) and inside it (FIG. 2K).

X-ray radiation of varying intensity was recorded in all experiments before destruction and from fragments after destruction. At the time of destruction, X-ray was not recorded. This fact confirms the idea that the energy of this radiation is absorbed by the atoms between which the bond was broken.

The delay of radiation of particles as a result of destruction, calculated from the length of the span and velocity is 1.6-0.3 μs. This fact suggests that this energy of metastable atoms was not stimulated.

All experiments confirmed the inventor's hypothesis that X-rays cause a break between atoms, leading to a loss of integrity. The formation of regions with increased stress and the delayed emission of photons is a consequence of the change in the condition of dynamic equilibrium, caused by a change in the electronic structure of atoms in a local region.

BRIEF DESCRIPTION OF FIGURES

The patent or application file contains at least one drawing executed in color. Copies of this patent or patent application publication with color drawing(s) will be provided by the Office upon request and payment of the necessary fee.

The present invention covers a wide range of dynamic processes in inorganic objects, investigated in experiments No. 1 to No. 36, and in the growing pine-No. 37, in the roots of the growing strawberry-No. 38, and in human organs: the brain-No. 39, the spine-No. 40, the loin No. 41, and the chest No. 42.

Figure 3A:
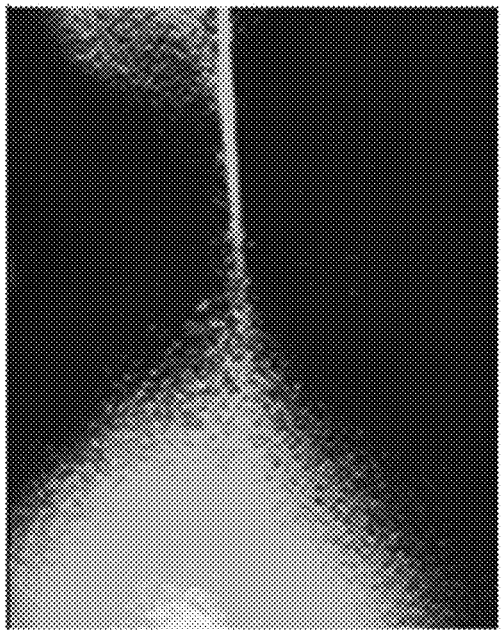

The results of the experiment are shown in the table "Experimental study of X-rays emissions" chart.

FIG. 1A illustrates the moment of a copper plate rupture fixed in the upper and lower parts when it is stretched. Radiation in the upper and lower halves as a result of deformation before and after destruction.

FIG. 1B illustrates an internal crack-like defect in a steel beam caused by an impact.

FIG. 1C illustrates the moment of formation of a crack in a cobblestone, (dark region), divided into two parts during a sudden cooling from a temperature of 500° C. down to 12° C.

FIG. 1D illustrates the moment of destruction of a high-strength steel rod. The rod fixed in the upper and lower parts was destroyed in the central part by the movement of the piston from left to right. The photograph illustrates the distribution of luminous regions not only in the metal, but also in the air space caused by retarded radiation from fragments formed after the destruction.

FIG. 1E illustrates the moment of formation of two cracks in a glass plate cooled in liquid nitrogen during a point impact.

FIG. IF illustrates the moment of rupture of the top hole in the place of attachment of the aluminum plate when it is stretched.

FIG. 1G illustrates the moment of partial rupture of the upper right hole at the place of attachment of the aluminum plate, similar to the previous one, but fixed at two points during its stretching. The experiment was terminated before the plate was broken.

FIG. 1H illustrates irradiation of a Pb—Sn alloy wire, the thickness of which varies from 3 mm to 0.004 mm, by radiation from particles formed after the destruction of steel. Exposure time 10 minutes.

FIG. 1I illustrates irradiation of the same sample for 30 minutes.

A container with photographic film was placed under a steel bar 1.55" thick, on the upper surface of which one blow was struck with a hammer. FIG. 2A illustrates X-rays radiation recorded by the photographic film.

FIGS. 2B-2H illustrate the X-rays emitted by an impact with the tip of an ax (FIG. 2D) on the surface of a 4×9.5 I-steel beam, fixed by photographic film located on the opposite surface at a distance of 4" from the impact point. FIG. 2B illustrates the X-ray radiation recorded on a film located on the left butt at a distance of 14" from the impact point. FIG. 2H illustrates the X-ray radiation recorded on the film located on the right butt at a distance of the impact point 70." Note. Only some frames, located between the point of impact and the butts are shown.

FIG. 2I illustrates the dark stripe of an ax striking a wooden rod and the green response 0.4" to the left of it. The most remote response is located on the right at a distance of 11.4" and is shown in FIG. 2E.

Frame 2J illustrates the luminescence of a steel washer excited by beams emitted from particles generated by the destruction of a copper plate.

A fragment of the hacksaw blade 0.5 mm thick, shown in FIG. 2K was irradiated with X-rays from particles of the same alloy formed after destruction. The photo shows intense X-ray absorption.

Three photos, shown in FIGS. 2M, 2N, and 2O, illustrate X-rays from strawberry roots. FIG. 2P illustrates the luminescence of a steel washer located on the surface of the container when irradiated from particles formed upon contact of a copper alloy plate with a rotating grinding stone; FIG. 2L illustrates the luminescence of a Pb—Sn alloy wire located inside a container when irradiated from particles formed upon contact of a steel plate with a rotating grinding stone.

Figure 3B:
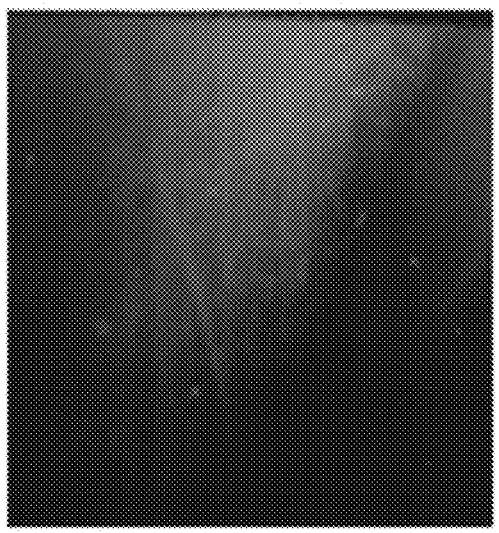
Figure 3C:
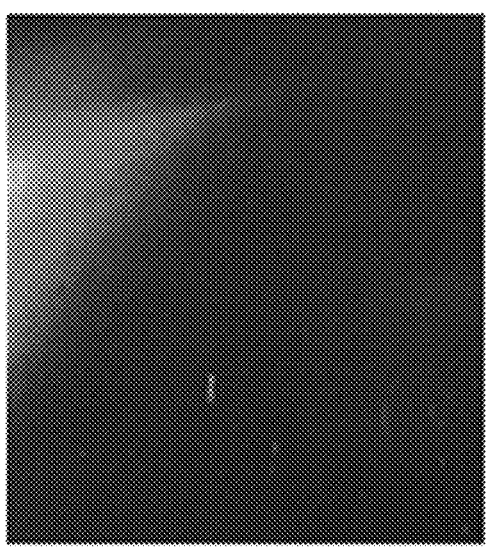
Figure 3D:
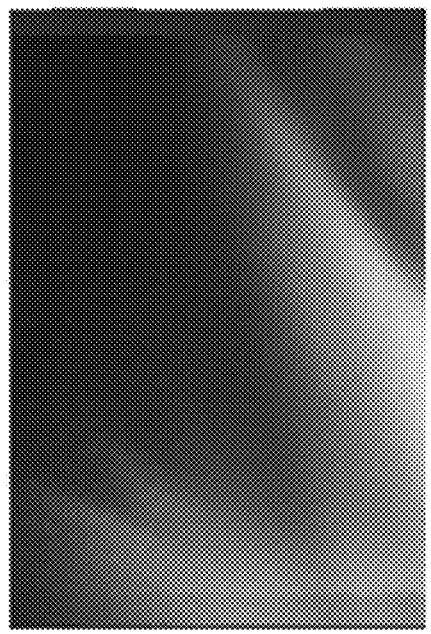
Figure 3E:
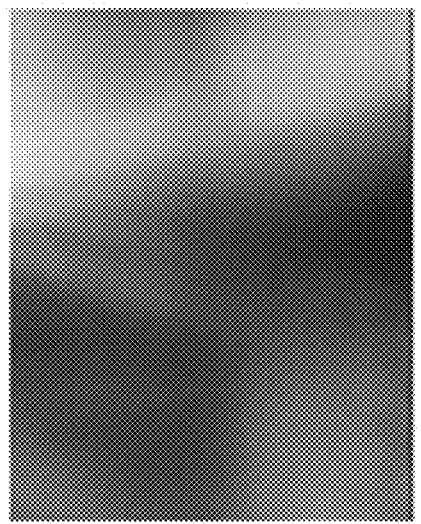
Figure 3F:
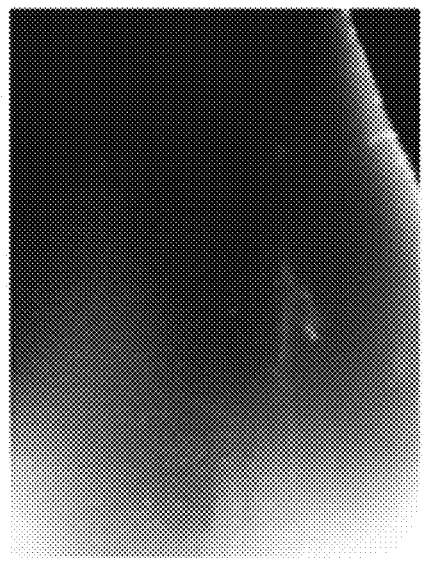
Figure 4A:
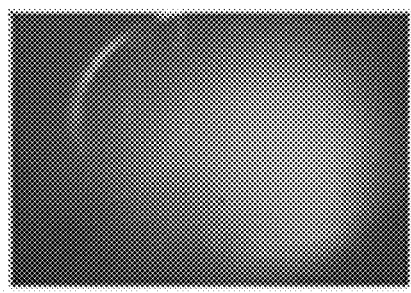
Figure 4B:
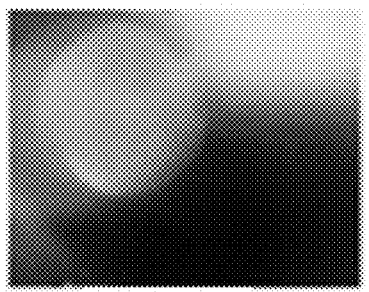
Figure 4C:
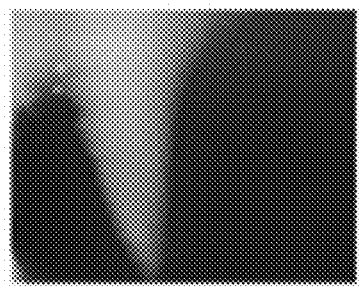
Figure 4D:
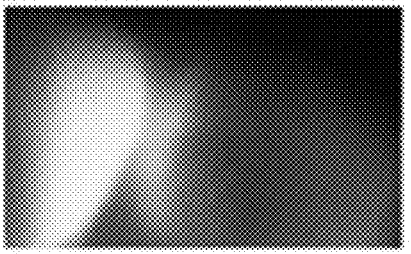
Figure 4E:
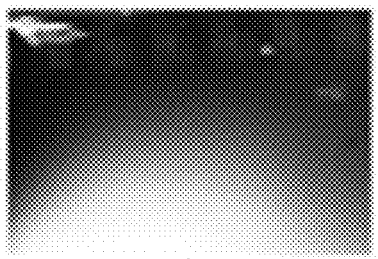
Figure 4F:
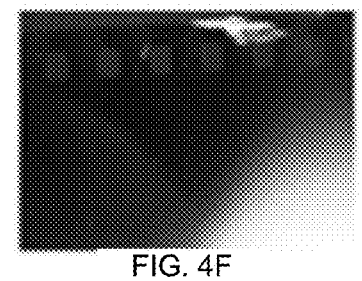
Figure 4G:
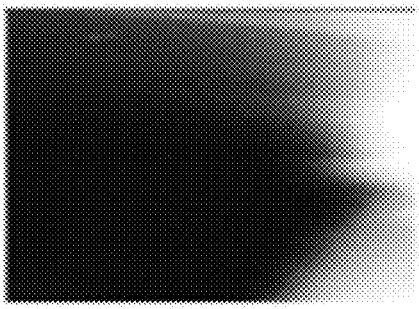
Figure 4H:
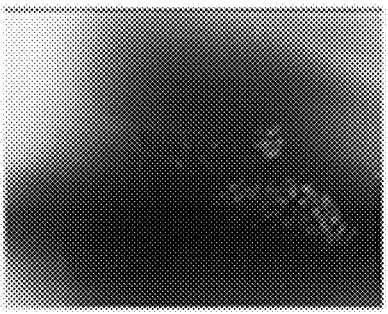
Figure 4I:
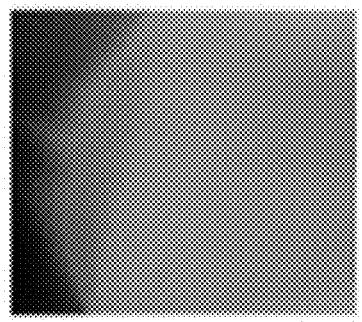
Figure 4J:
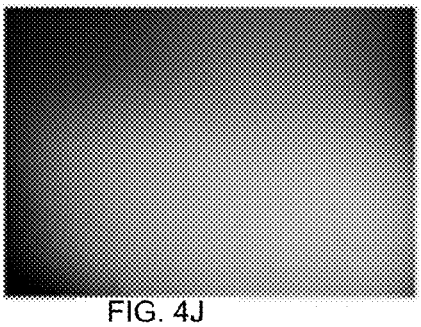
Figure 4K:
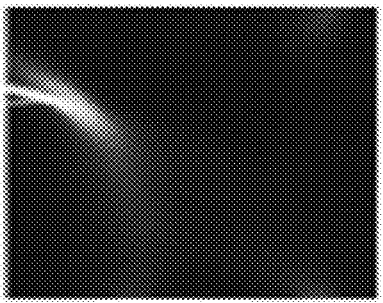
Figure 4L:
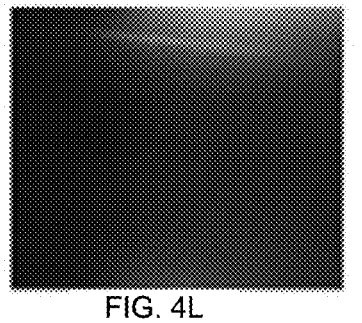
Figures 5A, 5B, 5C, 5D, 5E:
Figures 5F, 5G, 5H, 5I:
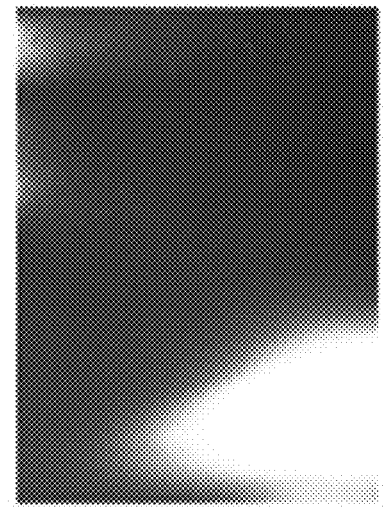
Figure 6C:
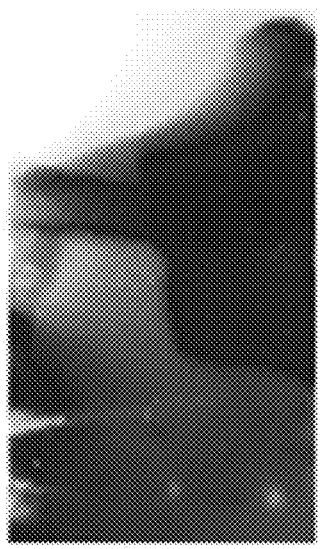
Figure 6F:
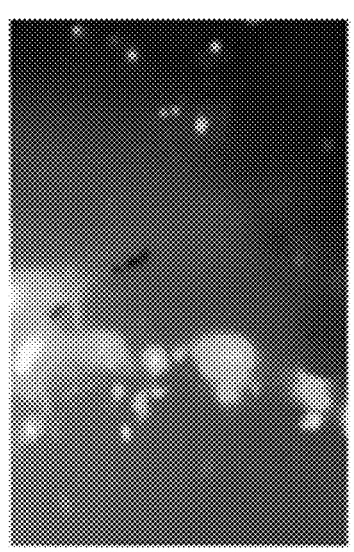
Figure 6I:
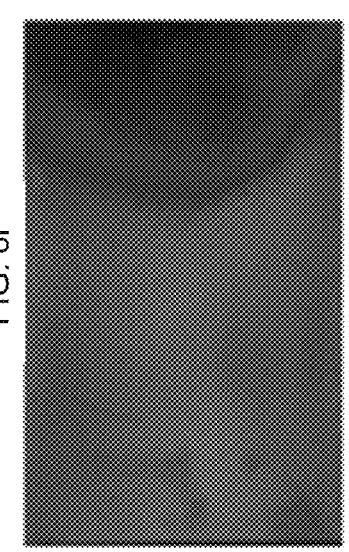
Figure 6B:
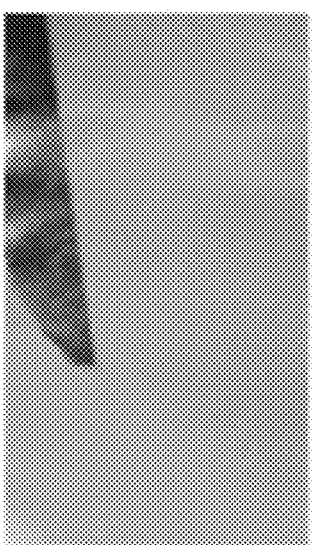
Figure 6E:
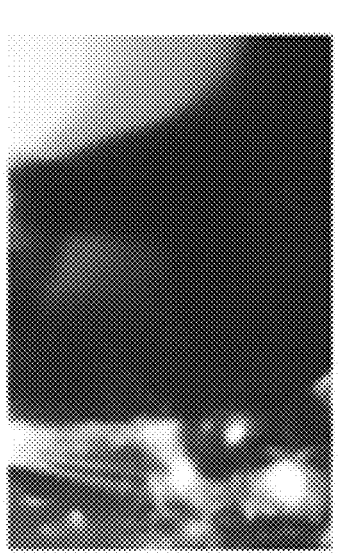
Figure 6H:
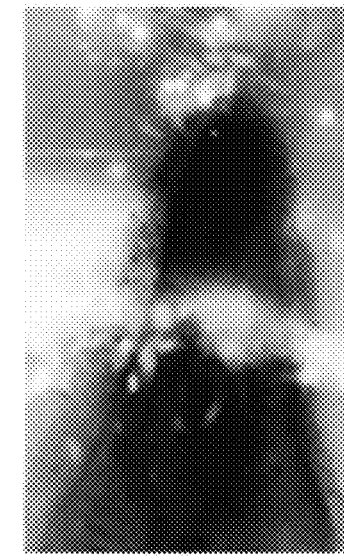
Figure 6A:
Figure 6D:
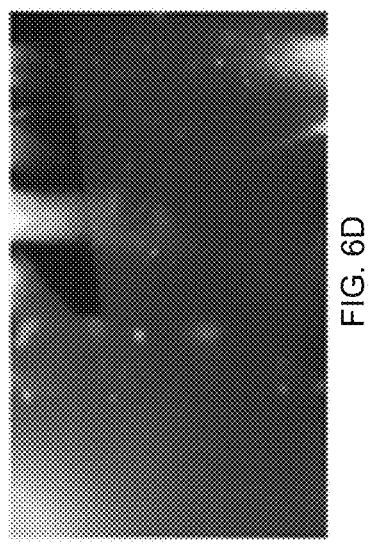
Figure 8C:
Figure 8F:
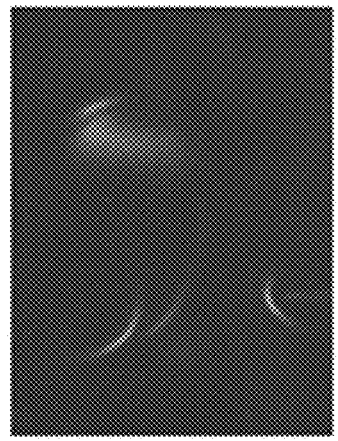
Figure 8I:
Figure 8B:
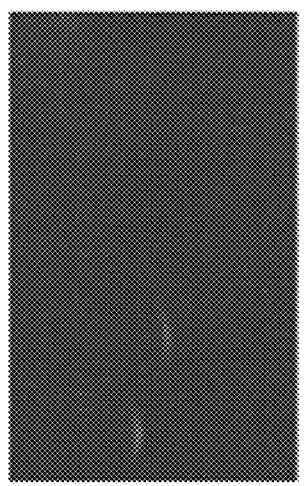
Figure 8E:
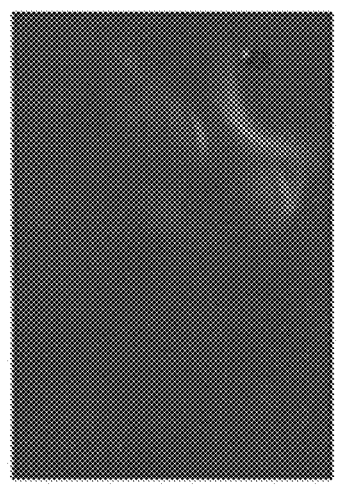
Figure 8H:
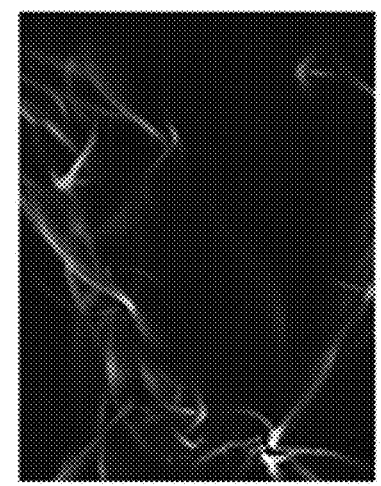
Figure 8A:
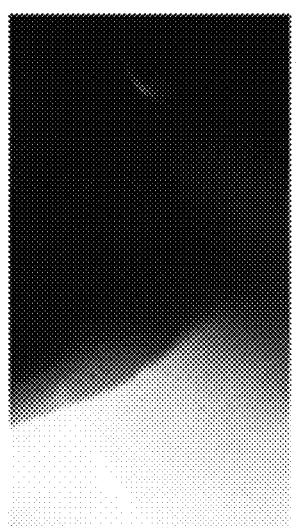
Figure 8D:
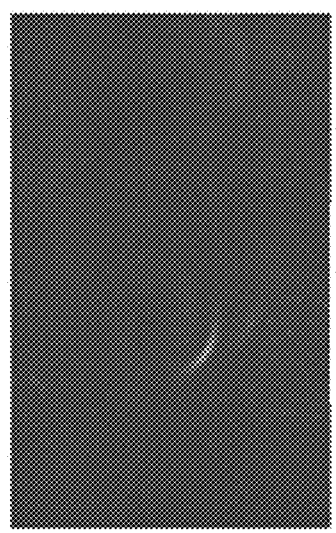
Figure 8G:
Figure 9C:
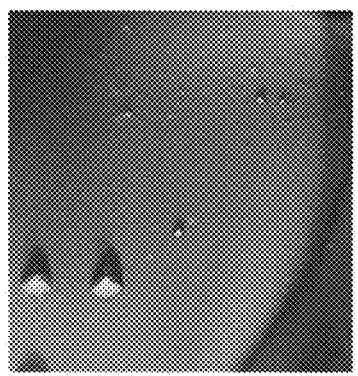
Figure 9F:
Figure 9I:
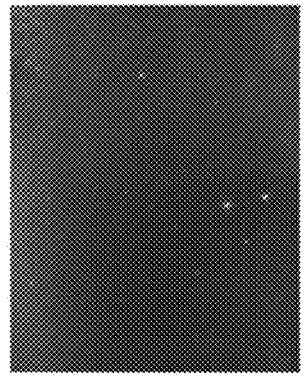
Figure 9B:
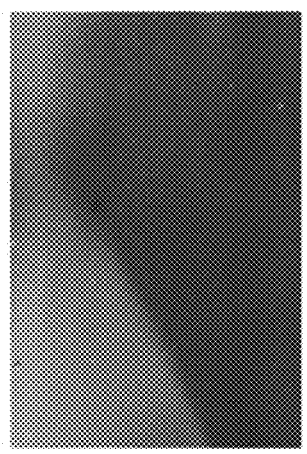
Figure 9E:
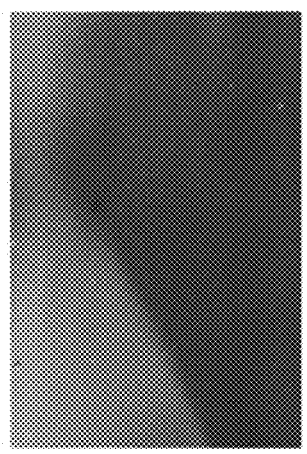
Figure 9H:
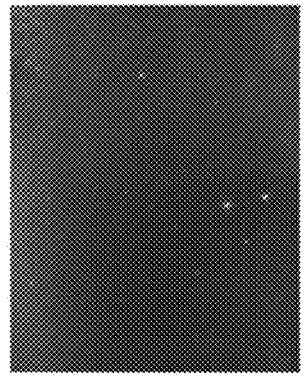
Figure 9A:
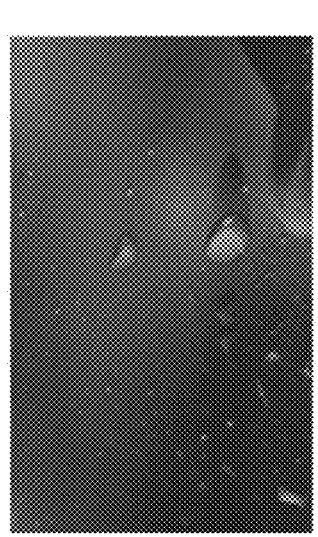
Figure 9D:
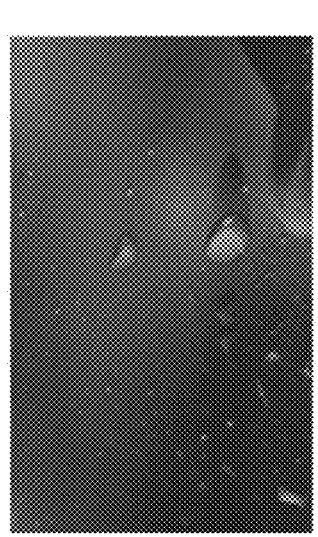
Figure 9G:
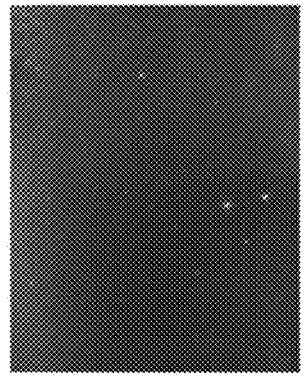
Figure 10A:
Figure 10B:
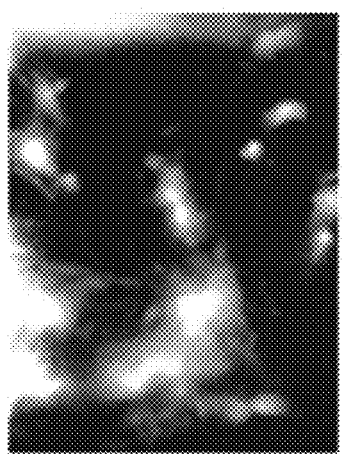
Figure 10C:
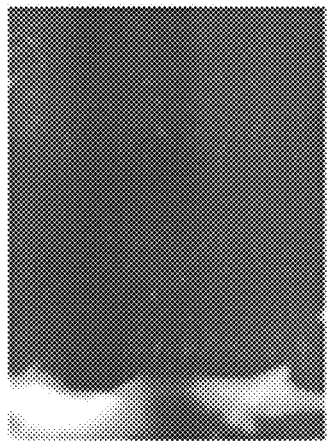
Figure 10D:
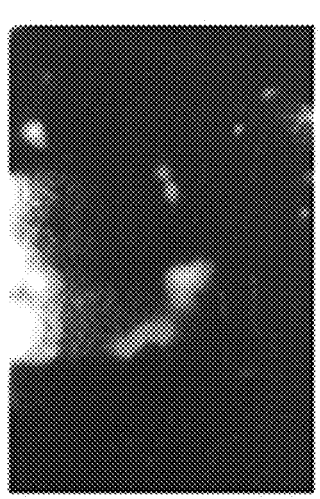
Figure 10E:
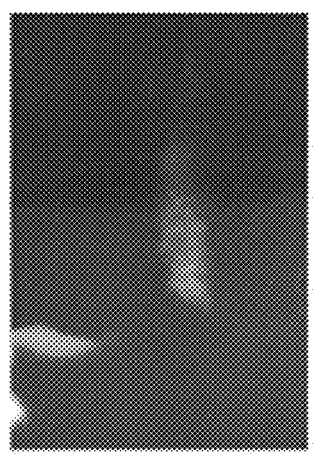
Figure 10F:
Figure 10G:
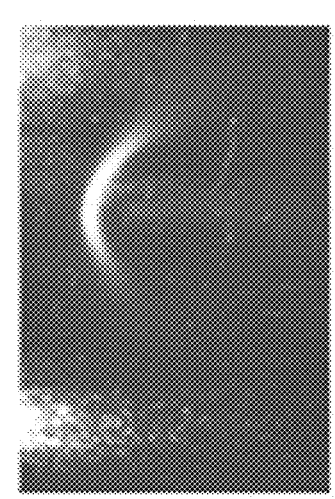
Figure 10H:
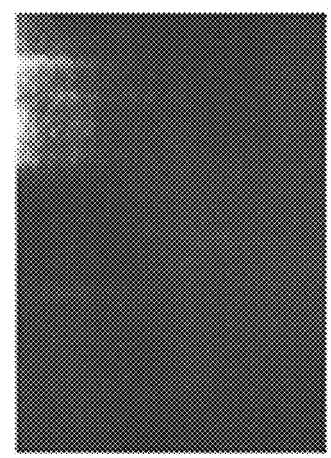
Figure 10I:
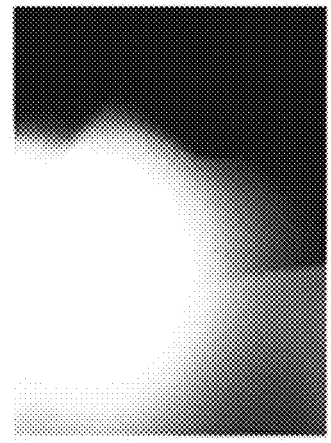
Figure 12A:
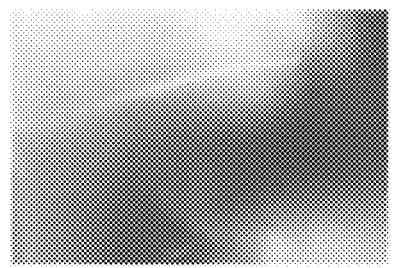
Figure 12B:
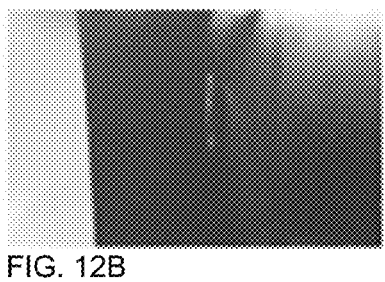
Figure 12C:
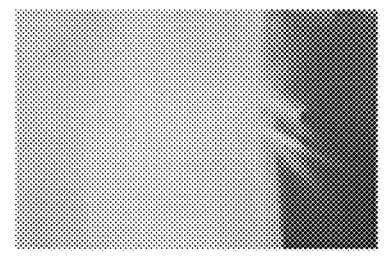
Figure 12D:
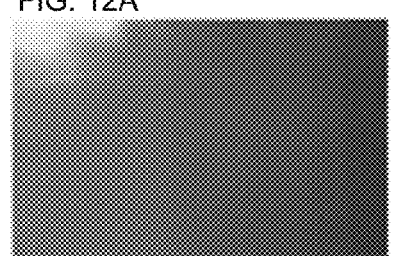
Figure 12E:
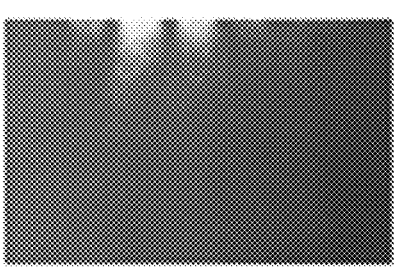
Figure 12F:
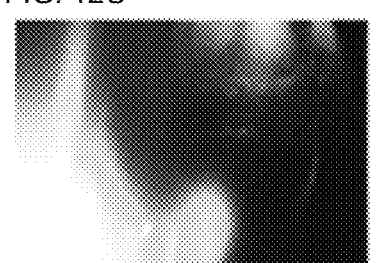
Figure 12G:
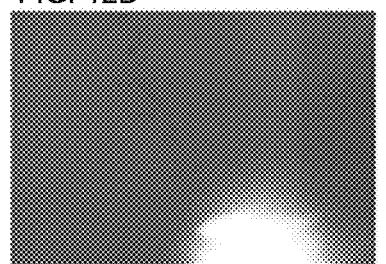
Figure 12H:
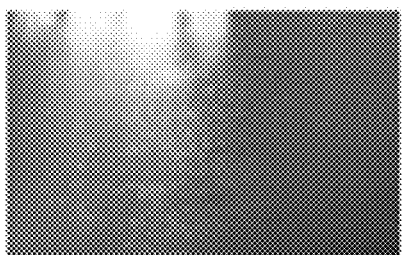
Figure 12I:
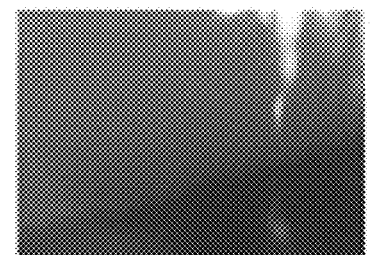
Figure 12J:
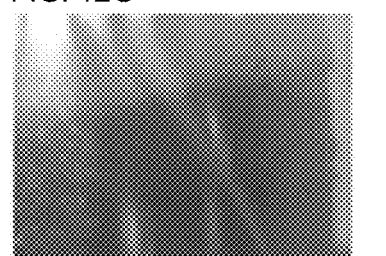
Figure 12K:
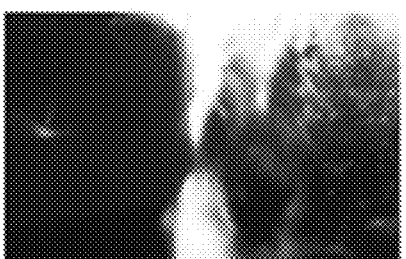
Figure 12L:
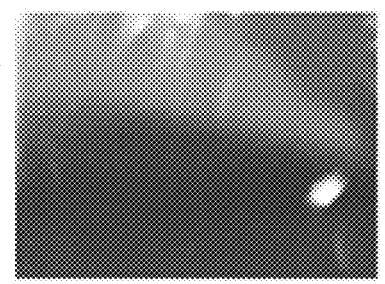

The photos shown in—FIGS. 3-10 illustrate the X-ray radiation that occurred during the process:
  solidification of molten plastics—FIG. 3A,
  solidification of molten silumin—FIG. 3B,
  solidification of molten aluminum alloy 7075-T651—FIG. 3C,
  destruction of flagstone at bending—FIGS. 3D and 3E, and impact—FIG. 3F,
  drilling holes in concrete—FIG. 4A,
  luminescence in the X-ray of a steel washer irradiated with radiation from particles of a copper alloy after destruction—FIG. 4B,
  welding steel parts—FIG. 4C,
  pine growth—FIGS. 4D, 4E, and 4F,
  battery discharge FIGS. 4G, 4H, and 4I,
  chemical reaction of soda and vinegar FIG. 4J,
  chemical reaction between iron alloy and electrolyte FIGS. 4K and 4L,
  copper alloy corrosion—FIG. 5A,
  steel corrosion—FIGS. 5B, 5C, 5D, and 5E,
  some areas of the brain of the inventor—FIGS. 5F, 5G, 5H, and 5I,
  some areas of the spine of the inventor—FIG. 6,
  some areas of the back of the inventor—FIGS. 7A-7F;
  friction of aluminum container loaded with flagstone and asphalt—FIGS. 7G-7I,
  some areas of the cell in the heart and lungs of the inventor—FIG. 8A-8I.,
  at impact of a stone with mass 15 kg, which fell from a height of 5 m onto the surface of the water in the container filled with flagstone, in which the film was placed U-shaped at the bottom and up along the side surface—FIGS. 9A-9I, and
  hitting the stone in the same experiment, but the second film was placed on a circle on the outer surface of the container—FIGS. 10A-10I.

72 Photos shown in—FIGS. 11-16, are of particular interest, since they are obtained by X-ray radiation caused by the movement of a locomotive by rail road.

FIGS. 11A-11R illustrate the X-ray radiation recorded on a photographic film placed in a container located on the sleeper between the rails perpendicular to them.

FIGS. 12A-12L illustrate the X-ray radiation recorded on a photographic film placed in a container located on the web of the rail. Locomotive was stopped three meters before the film.

FIGS. 13A-13I illustrate the X-ray radiation recorded on a photographic film placed in a container located on the web of the rail, but in the snow.

FIGS. 14A-14L illustrate the X-ray radiation recorded on a photographic film placed in a container located on the rail foot.

FIGS. 15A-15L illustrate the X-ray radiation recorded on a photographic film placed in a container located on the rail web after the passage of a locomotive in the forward and reverse direction.

FIGS. 16A-16H illustrate the X-ray radiation recorded on a photographic film placed in a container located on the frame of the locomotive.

Figure 17A:
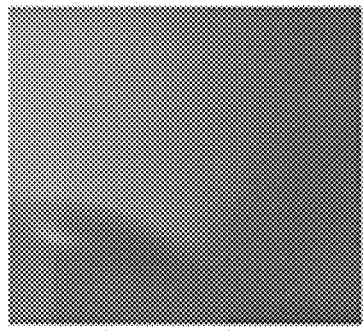
Figure 17B:
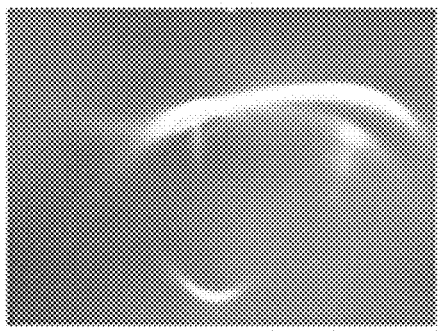
Figure 17C:
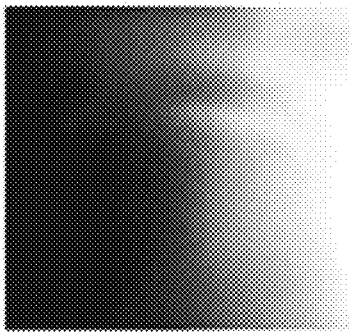
Figure 17D:
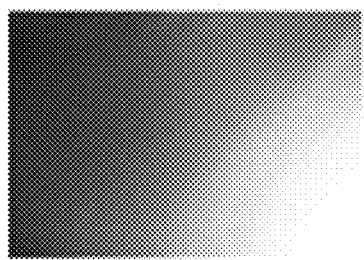
Figure 17E:
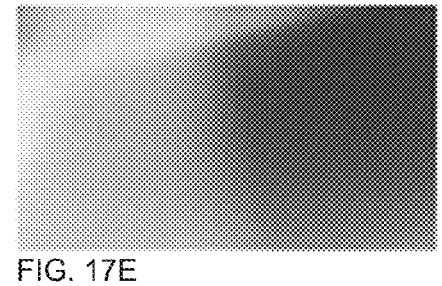
Figure 17F:
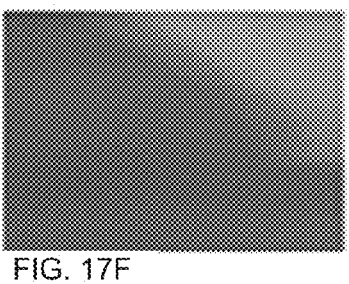
Figure 17G:
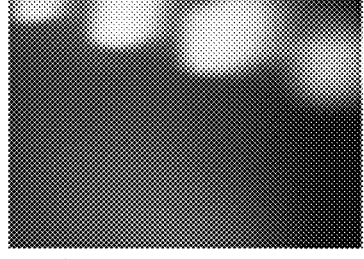
Figure 17H:
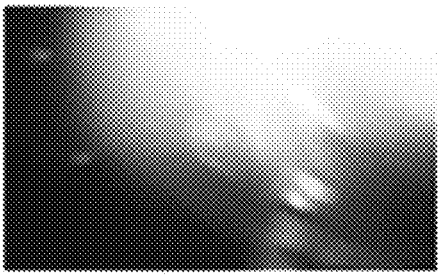
Figure 17I:
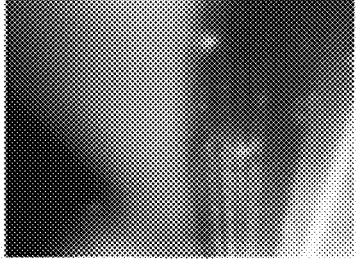
Figure 17J:
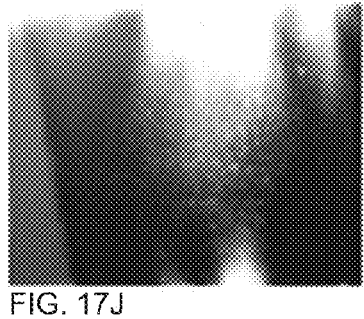
Figure 17K:
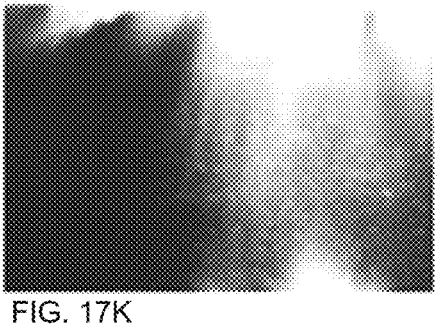
Figure 17L:
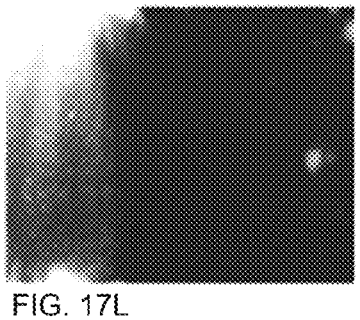

FIGS. 17A-17F illustrate the X-ray radiation recorded on a film placed in a container located three meters from the railway, which was exposed for two days. FIGS. 17G-17I illustrate the X-ray radiation recorded on a photographic film placed in a container 5, 9, 26 mm from the bottom surface of a 6 mm thick steel plate caused by an ax hit on the top surface; FIGS. 17J-17L illustrate the X-ray radiation recorded on a photographic film placed in a container located 15, 18, and 21 mm from the surface of this plate caused by a hammer impact on the butt.

Figure 18A:
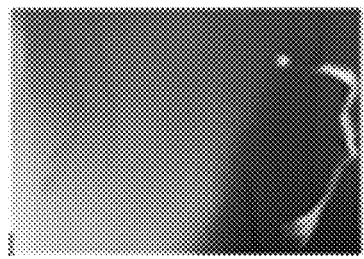
Figure 18B:
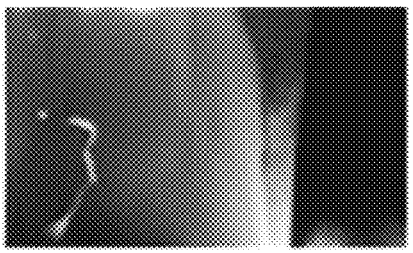
Figure 18C:
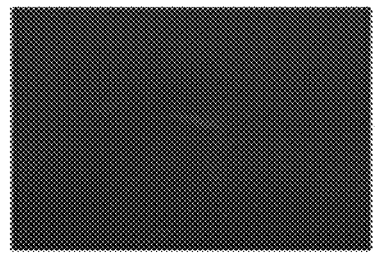
Figures 18D, 18E:
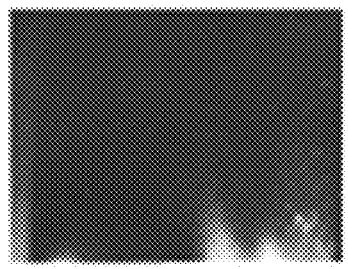
Figure 18F:
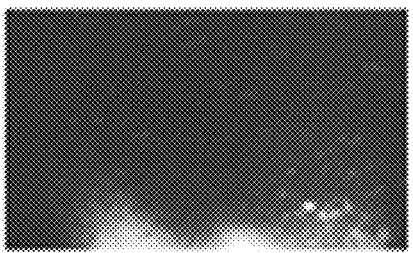
Figure 18G:
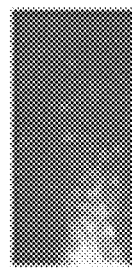
Figure 18H:
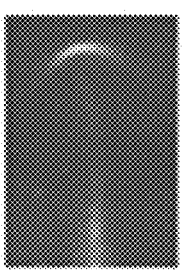
Figure 18I:
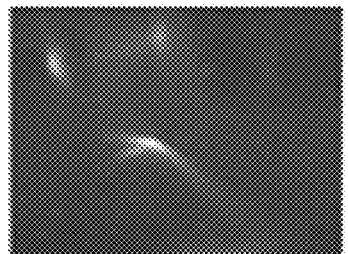
Figure 18J:
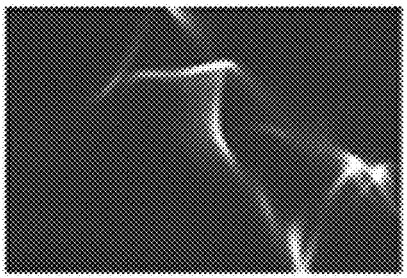
Figure 18K:
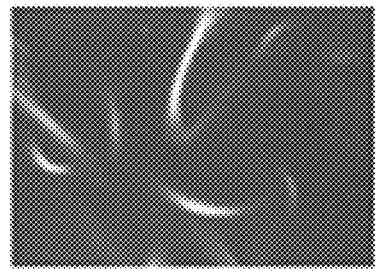
Figure 18L:
Figure 18M:
Figure 18N:

FIGS. 18A-18N illustrate the X-ray radiation recorded on 14 frames of film, located in a container spirally on the surface of a cylinder with ice, in the center of which water vapor was passed through a tube having smaller diameter.

FIGS. 19A-19X illustrate the X-rays due to the deformation of the rail as the locomotive moves while performing the control experiment.

FIG. 20 illustrates the formation of three types of electromagnetic, including X-ray, radiation. Photos shown in FIGS. 20A-20H are used to demonstrate for the result of atomic processes during which the formation of pores, cracks and fracture occurs;

FIGS. 20I-20P, are characteristic not only of the processes occurring during deformation, but also of those that caused the growth of plants and the vital functions of human organs.

Figure 21:
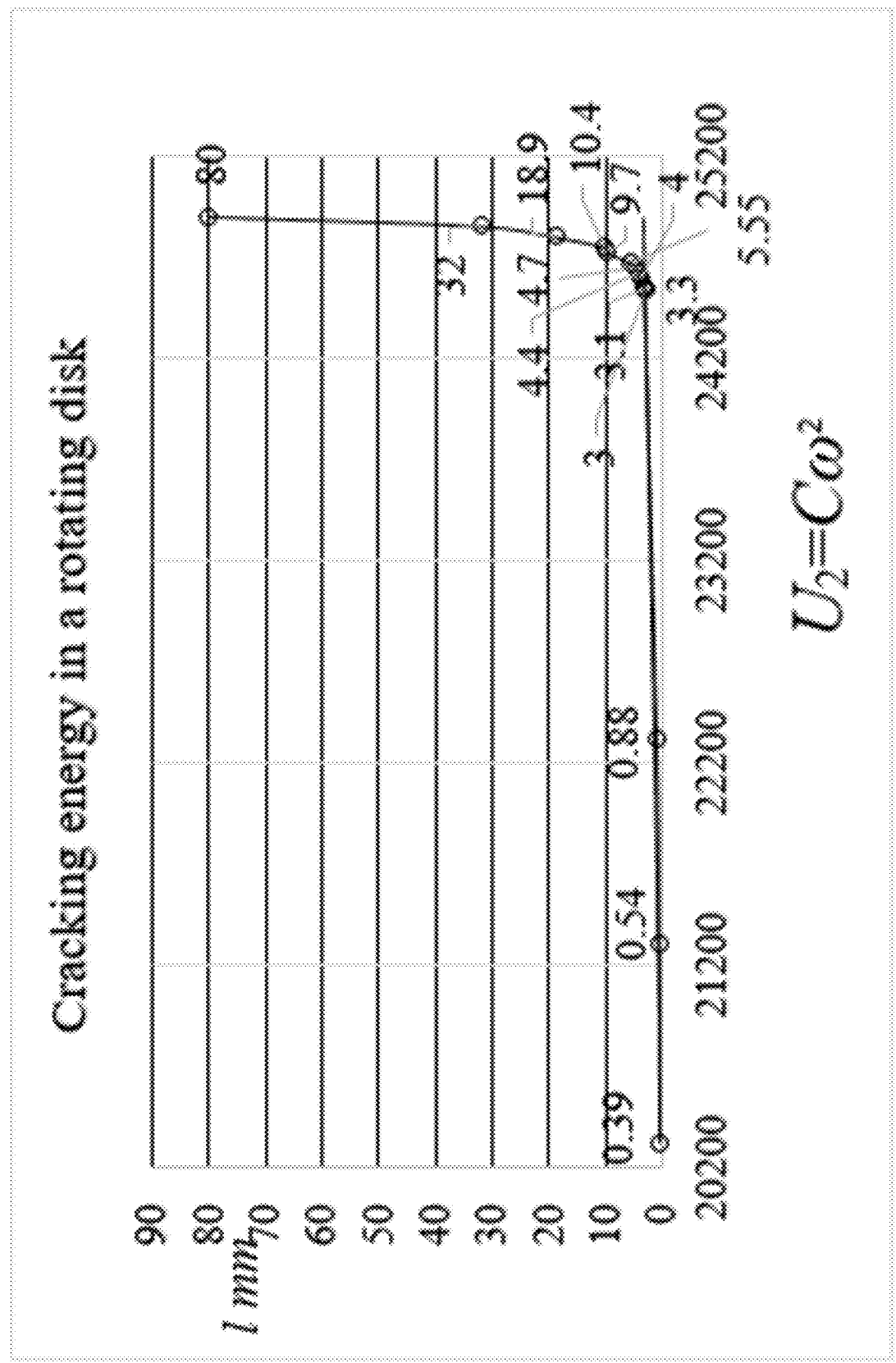

FIG. 21 illustrates the dependence of the crack length in a rotating compressor disk on rotational energy.

Figure 22:
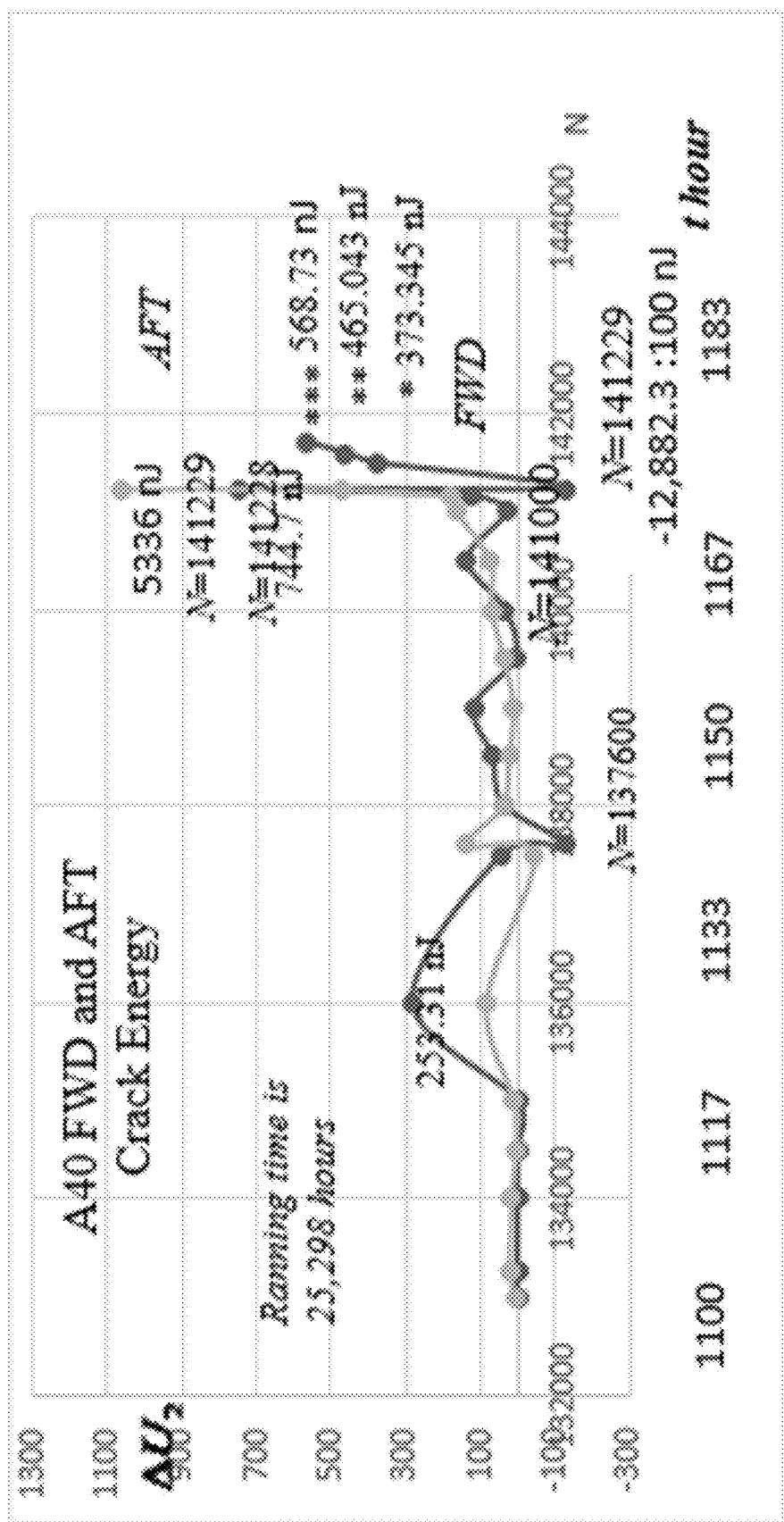

FIG. 22 illustrates the use of the method proposed in the invention for a comparative assessment of the danger of two cracks formed to the right and left of the rivet hole A40 in an experimental study of the fuselage panel of the Boeing 737-232 (B727).

Figure 23:
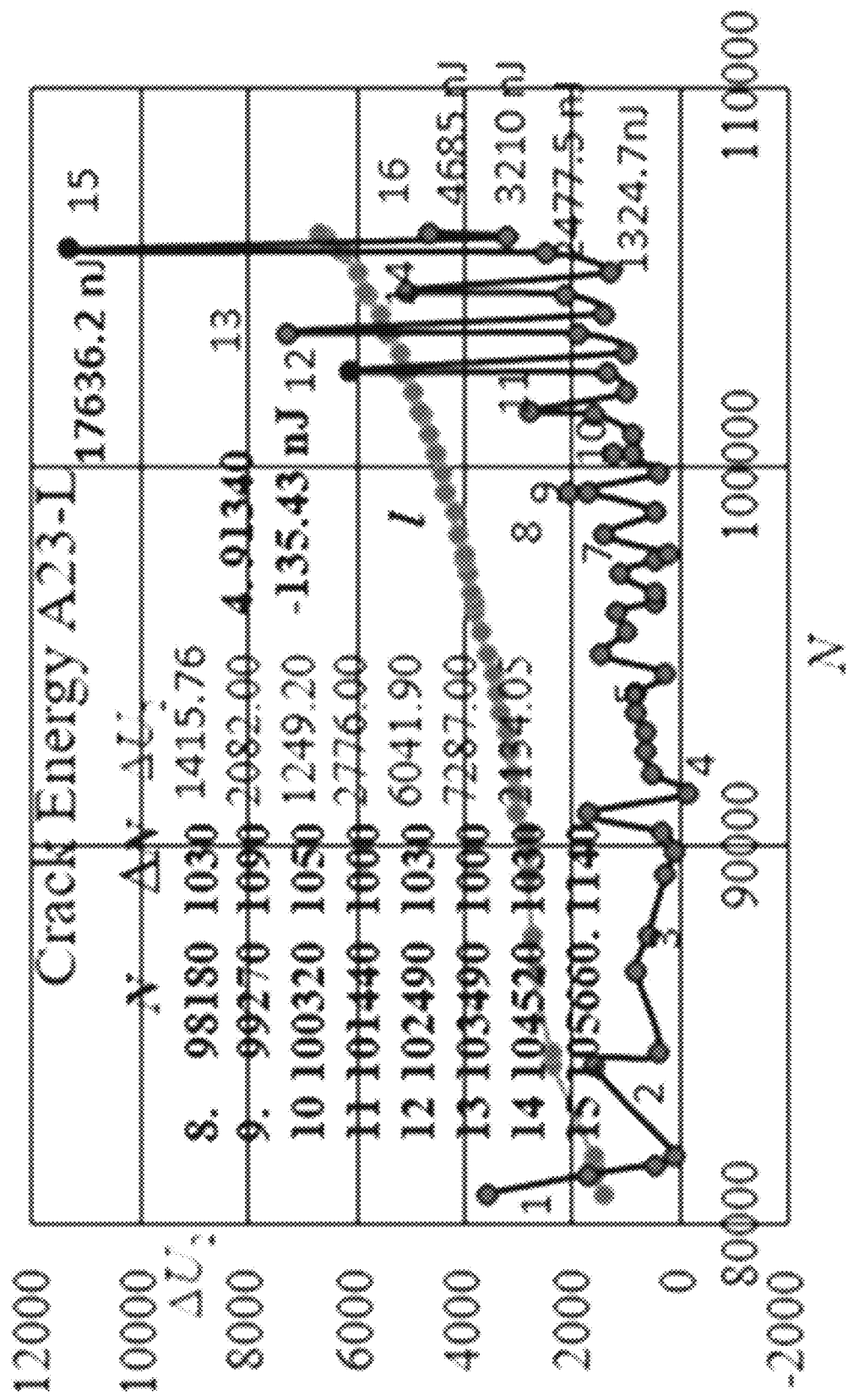

FIG. 23 illustrates the process of the formation of a crack to the left of the rivet hole A23 in an experimental study of another fuselage panel of the same aircraft.

Figure 24:
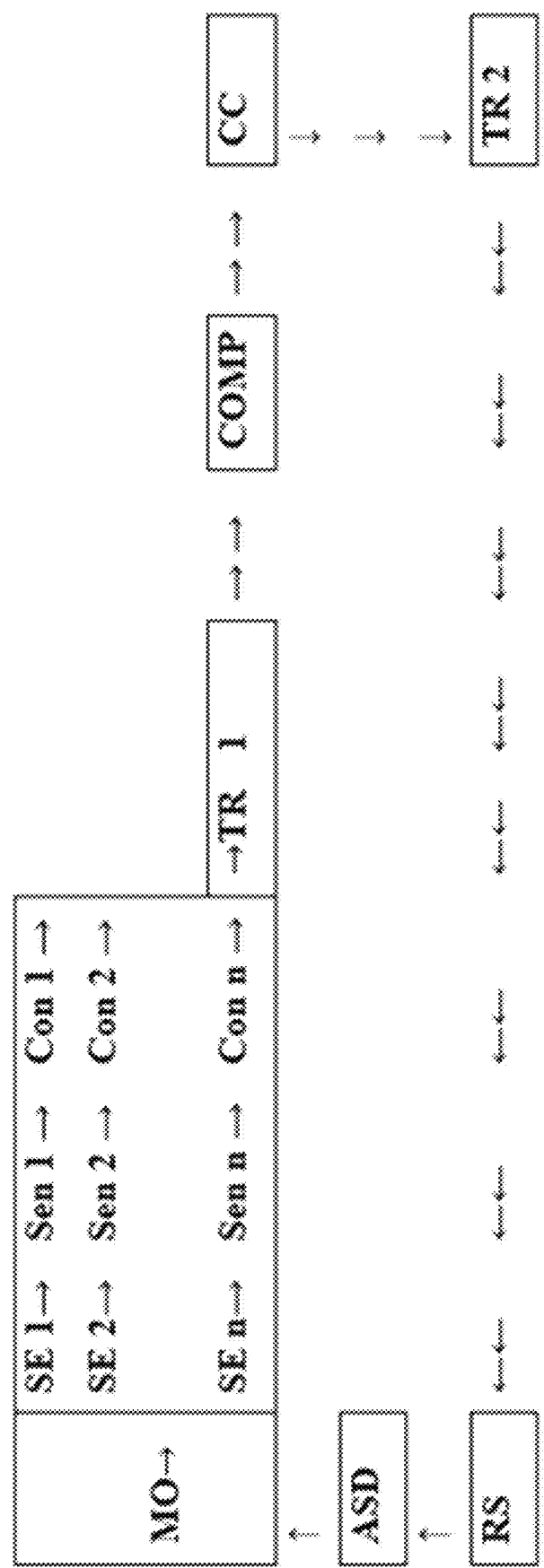

FIG. 24 illustrates a scheme for measuring the intensity of electromagnetic radiation of structures and devices.

FIG. 25 illustrates a diagram of an experimental study of rail X-rays radiation during locomotive movement.

Figure 26:
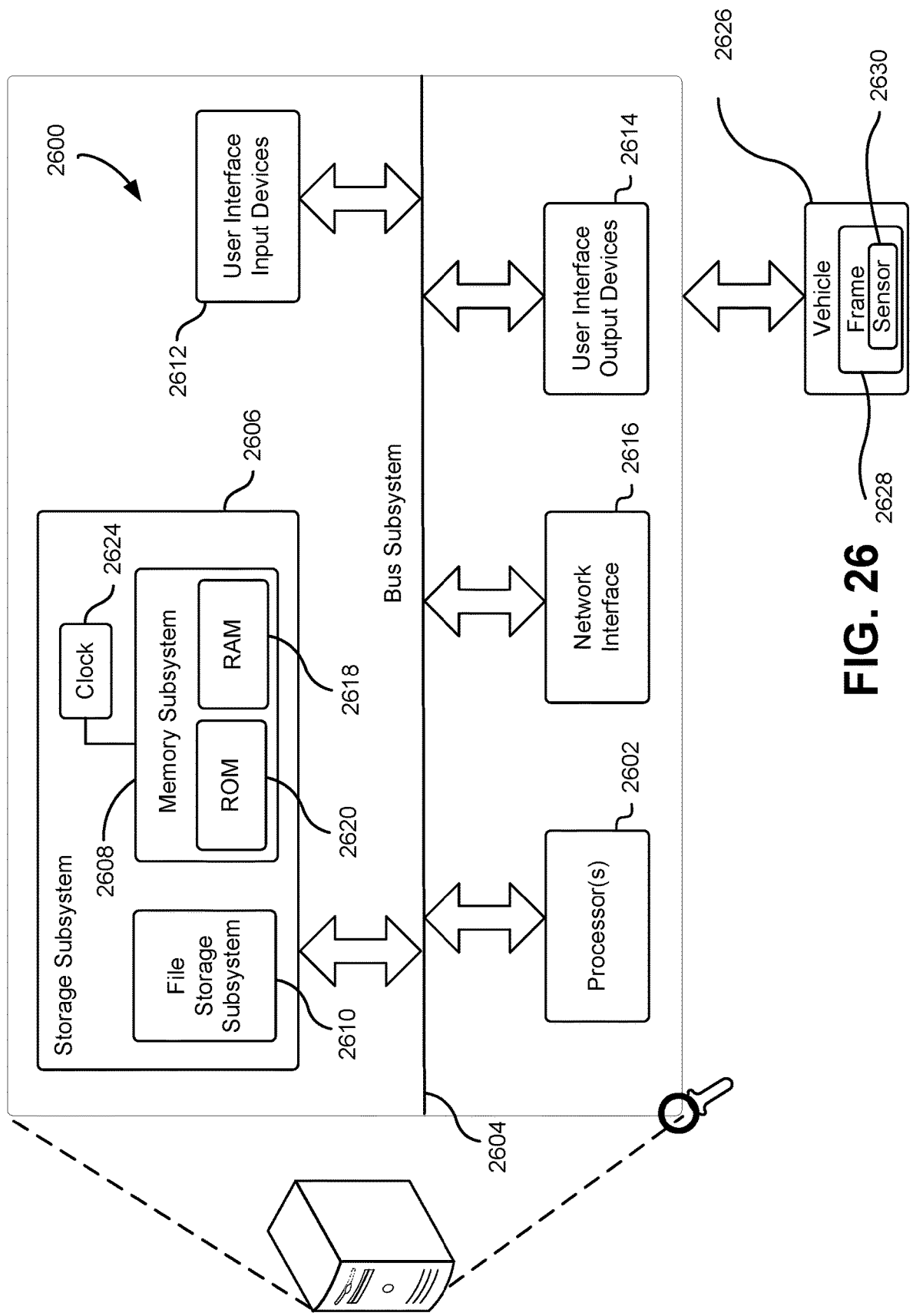

FIG. 26 is an illustrative, simplified block diagram of a computing device that can be used to practice at least one embodiment of the present disclosure.

ANALYSIS OF THE EXPERIMENTAL RESEARCH

The experimental study carried out by the inventor not only refuted conventional energy source hypotheses but also indicated the need to identify areas that radiate or absorb energy.

The final table of X-ray research results, is based on an analysis of 836 photographs obtained from experimental studies of the deformation and fracture of various materials, including 234 photographs recorded during locomotive movement. X-rays were observed in all materials studied, regardless of their composition and structure, in all dynamic processes in inorganic and organic materials, including cells of a living organism. This fact allows us to conclude that the proposed method is universal.

The difference between the number of tests and the number of photographs is due to the fact that in some trials more than forty photographs were observed at the same time, in other cases when the intensity of radiation was low, for example, 8-15 drills were required to get one frame. However, each photograph is not random—it was obtained to demonstrate the application of the method on each specific technological operation. Experts in each industry can perform similar experiments on a planned program.

FIG. 1A shows that the radiation in both upper and lower parts was caused by the deformation as before, as well as after destruction. There's no radiation at the moment of destruction because all the energy was used to break the connection between the atoms. Radiation in the lower part is caused by the transition of the electrons from the metastable level to the normal one, excluding the atoms, which weren't used in the process of the formation of the impulse that resulted in a crack.

FIG. 1D. The photograph illustrates the distribution of luminous regions not only in the metal, but also in the air space caused by delayed radiation from fragments formed after destruction. Thee dark region in the middle part of the rod indicates the absence of metastable atoms with increased energy in it. The experiment indicates that stress concentrators exist, but they are the result of changes in the energy state of local regions.

FIG. 1F. The plate had two notches, the right of which is visible in the photo. We see that the upper part of the plate has a red tint, indicating that the frequency of X-ray photons is lower than the frequency of those photons that are emitted in the central part. A clear distribution of luminous regions characterizes the distribution of metastable atoms, the detailed study of which is of particular importance for understanding the processes of destruction and the design of the element of a structure or device Pb—Sn alloy wire with a diameter of 3 mm flattened to a thickness of 0.004 mm was irradiated with radiation from steel particles formed upon contact with a rotating grinding stone. Photo shown in FIG. 1H illustrates the result obtained by irradiation for 10 minutes. FIG. 1I, illustrate irradiation for 30 minutes. This experiment allows to conclude that the energy of photons emitted from steel exceeded 100 keV.

Photos shown in FIGS. 2A-2J demonstrate high penetrating power of X-rays in metal and wood, caused by an impact. But the same rays emitted from the particles, intensely absorbed by the metal, cause luminescence or heating. This phenomenon, called the inventor of self-emissive transparency, has been observed for the first time and was not theoretically predicted. The number of experiments performed by the inventor for verification is so large that it excludes the possibility of error. The name given by the inventor is similar to self-induced transparency, which was theoretically predicted and experimentally confirmed using a femtosecond laser. The lack of a theoretical explanation of the observed phenomenon does not exclude the possibility of its use in practice.

Photos shown in the application characterizes the distribution of the intensity and frequency of the emission spectrum causing luminescence. The central part is white in all cases while the color of the luminescence of the peripheral regions is more specific for lower excitation frequencies. This happens due to the peculiarity of X-ray radiation. An electron removed from a deeper energy level may be replaced not by a free electron, but by an electron from a level above. White color indicates a cascade transition of electrons from higher to lower levels.

Of particular interest are the six photographs shown in FIG. 4g-FIG. 4l.

The container with the photo film was placed under the PRO ECL series 29 battery, which was discharged during the day with a current of 1 ampere. The photographs of FIGS. 4G and 4H illustrate X-rays in the anode region. FIG. 4I illustrates X-rays in the cathode region. A similar phenomenon is demonstrated by FIG. 5F, obtained in the study of radiation due to biological processes in the brain of the inventor. The photo illustrates the operation of the hearing aid battery, the current strength of which is thousands of times less.

60 g of baking soda in a cylindrical beaker placed on a container were poured with vinegar until the chemical reaction completely ceased. FIG. 4J illustrates the X-rays due to the reaction.

This fact indicates that dynamic processes caused by atomic reactions are accompanied not only by the excitation of valence electrons that are participants in chemical reactions, but also by the excitation of electrons from deeper levels, the transition to which is the cause of the of X-ray photons emission.

The experiment performed to detect defects in rails and locomotive is of particular importance, demonstrating unlimited possibilities for obtaining important information about dynamic processes occurring in different parts of the rail and locomotive.

Five films located on different sections of the rail illustrate the appearance of similar and different energy emitters. FIGS. 11A-11R illustrate the X-ray radiation detected by a film located between the rails on the sleeper perpendicular to the rails. The radiation is caused by the deformation of the rails with a single pass locomotive over the film. Intense radiation recorded on FIGS. 11A and 11B on the one hand, and FIGS. 11Q and 11R on the other hand, is caused by deformation of rails and fastenings to the sleeper. A clearly defined luminous channel is fixed on FIGS. 11C-11P. The observed phenomenon is of practical interest, as on FIG. 11B there was one fixing defect, while on FIG. 11Q six such defects and a small luminous area on the bottom of the frame were recorded. A similar area is observed in FIG. 11O.

FIG. 12A-12L illustrates the X-ray radiation recorded by the film located on the rail web in the place in front of which the locomotive stopped, not reaching three meters. "Fan-like" radiation, fixed at FIGS. 12B, 12E, 12F, 12H, 12J, and 12K, is identical with that recorded in FIGS. 11K and 11Q. The formation of such radiation is due to snow, that is, water. Such luminous regions are observed in FIG. 13, FIG. 14, FIG. 15.

"Fan-like" radiation was detected in 55 photographs obtained by condensation of steam on the ice surface and its melting, corrosion of alloys in aqueous solution containing chlorine, plant growth, body impact on the water surface, destruction of flagstone, and deformation of the rail on which surface was snow, and from the organs of a living organism. The nature of the radiation indicates that it occurred on the surface as a result of breaking the bond between the oxygen and hydrogen atoms forming the water molecule, and their subsequent ionization. The second stage is the formation of compounds, occurred as a result of exothermic reactions. The mechanism of chemical reactions with catalysts was discovered by G. Ertl [See: G. Ertl, Nobel Lecture, Reaction at Surfaces: From Atoms to Complexity, December, 2007]. Photographs of the oxidation of carbon monoxide $2CO+O_2 \rightarrow 2CO_2/Pt$ (110) on the surface of platinum, obtained by photoemission electron microscopy on a surface of 360×360 μm, testify that as a result of the reaction spiral figures are formed due by chemical turbulence.

The difference between "Fan-like" and spiral-shaped figures indicates that in these two experiments there are various manifestations of atomic reactions.

The arc-shaped figures observed during deformation of a solid, plant growth, and reactions that cause energy processes in the cells of living organisms are not identical to those characteristics of chemical turbulence, not identical to vibrational chemical reactions of Belousov-Jabotinsky.

The photos shown in FIG. 17 and FIG. 11, witness that X-rays are emitted from the ground or emitted from a deformed rail will spread over a considerable distance in the ground.

The anisotropy of the response of the materials with respect to the direction of the acting force, as observed in the experiment with the I-beam (See FIG. 2A, 2B, and 2C), indicates the interaction of electromagnetic radiation with acoustic waves, leading to stimulated Brillouin scattering.

The identity of the response of the material during its hardening and destruction confirms the inventor's hypothesis that the energy of photons emitted during corrosion or spontaneously sufficient to locally melt the nanoscale region.

Numerous arc-shaped X-ray sources shown in FIG. 8 and FIG. 7, were observed in metals upon impact. The maximum number of such sources was recorded on a film located parallel to the direction of impact.

The disclosure of the mechanism of atomic processes caused by water-salt metabolism in plants and cells of a living organism is of particular importance. 14 photos from 22 shown in FIGS. 18A-18N demonstrate the processes that occur during vapor condensation at the border with ice (FIGS. 18A-18D), the boundary between liquid and ice. But on all photos not nanoscopic, but macroscopic radiating areas are fixed. This fact suggests that in a certain area atomic reaction are identical.

Photographs (FIGS. 18A and 18B) differ little from one another, but the rays fall on the surface of the films at an angle different by ~40°. This means that the radiation source is spontaneous. The energy of such sources is partially absorbed and increases the temperature. The local temperature is sufficient for a phase transition, but not sufficient for the formation of cracks.

The fact that the interaction of water with organic and inorganic materials begins with the decomposition of water on the surface allows the use of pump-probe and plasmon resonance to study these processes.

The experimental study based on which an invention is proposed shows that it can be implemented only on the basis of quantum mechanics, since the laws of classical mechanics are inapplicable when bodies approach each other at a distance of 2 nanometers, due to the cloud between them electrons emitted by each of the bodies.

The interaction of one electron cloud with other leads to a change in the electric field, which is accompanied by a change in the magnetic field and the formation of electromagnetic waves. This hypothesis, formulated by Maxwell, is confirmed experimentally and forms the basis of classical electrodynamics.

Electromagnetic wave is considered in quantum electrodynamics as an energy quantum, called a photon. The interaction between atoms is due to the exchange of electrons and photons. In other words, the process of destruction originates in the nanodomain.

Electrification by friction, due to the displacement of the electron cloud together with the body from which they are emitted, is accompanied by a discharge and a glow, which is called triboluminescence. Any type of deformation causes a relative displacement of grains, twins, or other fragments separated by a heterogeneity boundary. This fact is confirmed by research performed using electron microscopes and described in the literature.

The intense emission of electromagnet waves, observed during deformation, indicates that it is due to the displacement and/or rotation of grains and twins. This phenomenon is called by the inventor as internal triboluminescence.

Particularly intense displacement or rotation of the grains or twins occurs upon impact, causing maximum acceleration and the maximum change in electrostatic induction, resulting in an electromagnetic pulse with maximum energy.

The table below shows (See No. 24) that with five blows on samples from iron alloys, 76 photographs were taken, both in the direction of impact and at different angles in planes drawn through the direction of impact.

Similarly, a single blow to the surface of the water (See No. 28) caused X-rays in all directions, recorded in 53 photographs.

A large number of photographs were obtained to demonstrate the phenomenon, it allows one to draw certain conclusions about defects that are observed with dynamic processes caused by deformation, and without it.

Eight photos FIG. 20 (1-8) confirm the inventor's hypothesis about the main source of energy, the radiation of which is the cause of man-made disasters [See: V. P. Rombakh, Damage of Metals: Atomic Nature, International Conference on Fatigue Damage of Structural Materials V, Hyannis, Mass., USA (2004), Poster No 1; V. P. Rombakh, Atom Parameters and Metal Properties, Logistics Capital, Inc. Edmonds WA, USA, pp 311].

The formation of cracks occurs in the area in which energy is absorbed and cannot be fixed. The luminescence that is observed is due to spontaneous radiation that occurred before or after the destruction, just as it was recorded from particles many times.

The experiment refutes the hypothesis of the decisive role of the tip of a crack, which forms millions, or even billions, fractions of a second, the length of which depends on the energy absorbed by atoms; the accumulation of energy occurs in an area outside the crack. A clear boundary between these two regions is fixed in all observed experiments.

Figure 20B:
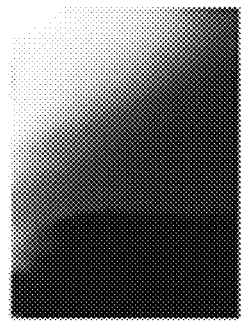
Figure 20C:
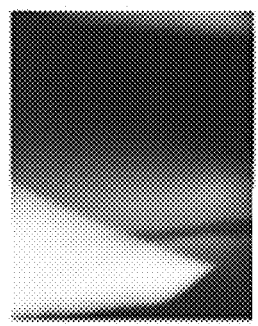
Figure 20D:
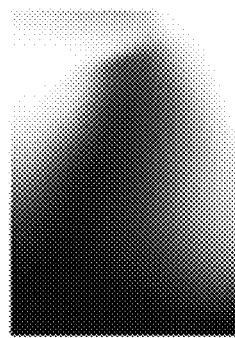
Figure 20A:
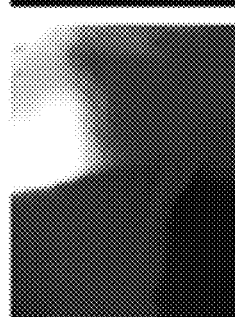
Figure 20F:
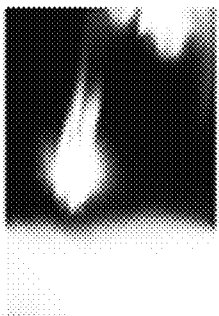
Figure 20G:
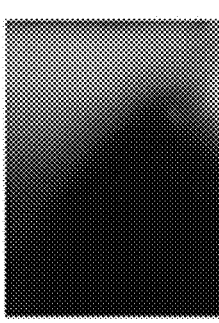
Figure 20H:
Figure 20E:
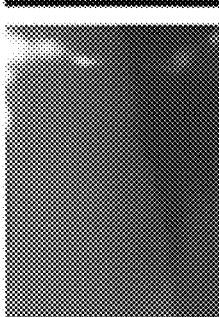
Figure 20J:
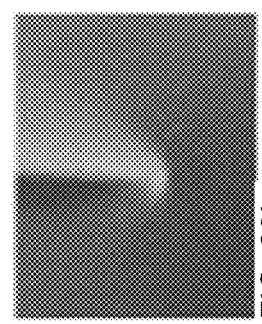
Figure 20K:
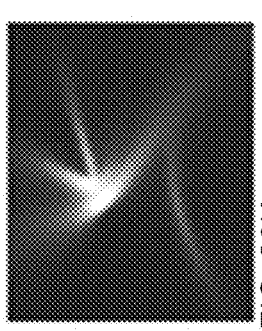
Figure 20L:
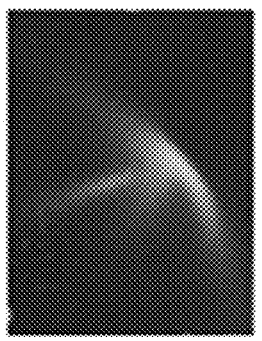
Figure 20I:
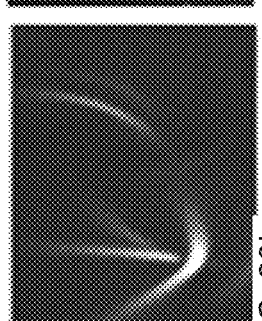
Figure 20N:
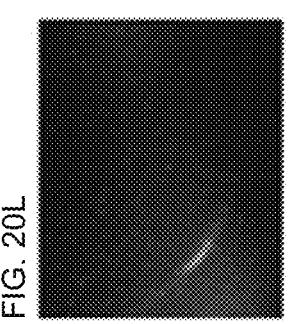
Figure 20O:
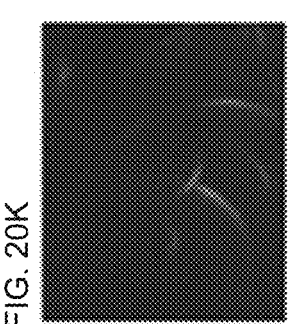

FIG. 20H illustrates the case when there were atoms in the damaged area, the radiation of which occurred with a delay.

Figure 20P:
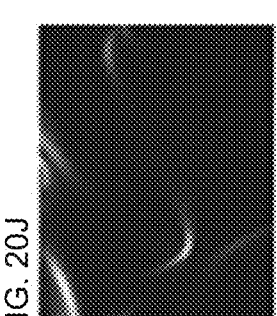
Figure 20M:

Photos shown in FIGS. 20A-20P, indicate that the number of types of defects that are detected by the shape of the radiator is limited. They can be classified and the effect on the material properties has been established experimentally.

Atomic Reactions of Dynamic Processes

Quantum mechanics allows us to estimate the energy state of an atom or group of atoms in the local region of the metal in theory and modern experimental base allows verification of this assessment. Therefore, by analogy with fatigue, we introduce the notion of normal AN and morbid (pathological, painful) atoms AM. A morbid atom is an atom that has changes that occurred in its electronic shell due to external influences.

Assume that all atoms (ions), under which the property of the material does not change a normal AN regardless of what they represent. Changing the properties of the material means that there was a change of parameters of a group of atoms.

We can describe all of the changes that occurred in the technical element of the structure or device using five atomic reactions:

1. $AN+h\nu \rightarrow AN^*=AM$ (I). Electron transfer to the metastable level.
2. $AN+h\nu_1 \rightarrow AM^+ + e^-$ (II). Forced additional ionization.
3. $AN+e^- \rightarrow AM^- + h\nu_2$ (III). Ion and electron recombination.
4. $AN^* - h\nu_3 \rightarrow AN$ (IV). Spontaneous or stimulated transition of an electron from the metastable level.
5. $AM^+ + e^- \rightarrow AN + h\nu_4$ (V). Here $AM^+$ is a morbid atom (ion) the charge of which is increased; AM is a morbid atom whose charge has fallen.

Only the induced radiation of energy from the destruction domain is sufficient to form a crack or fracture.

The law of destruction formulated by the inventor states: The loss of integrity of a solid and its destruction is the result of breaking the bond between atoms that have absorbed photons induced by local groups of metastable atoms, the excitation of which occurred as a result of the conversion of mechanical energy into electromagnetic and electromagnet energy into mechanical.

Cracking or fracture occurs when, after the bond is broken, the atoms are removed to a distance at which a new equilibrium state occurs. The formation of such a state is accompanied by acoustic oscillations, the frequency of which decreases from $10^{13}$ to $10^4$ Hz.

The reality of such a mechanism confirms the latent radiation of X-rays from fragments formed after destruction. This fact indicates that not all the accumulated energy was consumed.

The advantage of a method based on the use of a phenomenon whose law is revealed is due to the knowledge of cause-effect relationships. Empiric equations are proposed on the basis of statistical studies, but this does not exclude the possibility of the realization of an unlikely event at the beginning of operation, which leads to a disaster.

For example, the probability of an event due to which the shuttle Challenger crash occurred was estimated at 1:100,000. Such a low probability ruled out the possibility of a catastrophe during the entire service life, but a catastrophe occurred.

The X-ray radiation caused by the deformation and the luminescence caused by it are used for the first time as parameters on the basis of which the technical state of the object under study is evaluated and possible changes are made. The practical application of this phenomenon requires preliminary experimental studies to assess the basic parameters of the material, which is the accumulated energy and the rate of its accumulation. Material wear, its critical state, reliability and durability are not determined by strength, but by the ratio of energy accumulation rate to its dissipation rate.

Experiments performed by the inventor show that the use of modern experimental methods can reduce the testing time by tens of thousands of times, obtaining more accurate objective information about the processes leading to destruction.

The analysis of atomic reactions leading to destruction is possible on the basis of quantum mechanics. This fact dictates the need for voluntary or compulsory refusal to use erroneous methods in scientific and technical laboratories. This is the first step to solving the problem of forecasting and preventing man-made disasters.

The theory of spontaneous and stimulated radiation was developed by Einstein. The creation of a maser and a laser was an experimental confirmation of this theory.

The spontaneous radiation photons, not absorbed by the material, leave it. Measuring the intensity of spontaneous radiation $I_e(\nu)$ allows us to estimate the accumulated energy $U(\nu)$ and the rate of its accumulation, if the relationship between these parameters is established. The units of radiant intensity are watts per steradian. The total power (watts) emitted in a given frequency $$U(v) = \int_0^s I_e(v) dv d\Omega \qquad (2),$$

where the integral is taken over the closed surface S of the region in which the atoms emitting energy are.

The total energy radiated spontaneously by a local group of identical $N_i$ atoms in the frequency interval is $$U(v) = N_i A_i h v g(v) \qquad (3)$$

Here $A_i = \Sigma_j A_{ij}$ where $A_{ij}$ is the Einstein coefficient, which characterizes the probability of electron transition from level i to level j, which has dimension $s^{-1}$. $A_i$ characterizes all transitions from level i Thus, if $N_i(0)$ electrons were at the level i at the time t=0, then the number of electrons at this level decreases exponentially $N_i = N_i(0) e^{-A_i t}$ (4).

The possibility of applying Einstein's theory to analyze the processes of destruction is demonstrated by examples of solving specific problems. The lifetime of a domain of destruction is different from the lifetime of the metastable state of an individual atom, just as the time of existence of a forest is different from the time of existence of a separate tree. Wear and aging are due to an increase in the ratio of the number of morbid atoms to the number of normal atoms.

The process of energy accumulation in a substance during its deformation and pumping in a laser is carried out by an electromagnetic pulse excited in a different way. This difference of principle does not matter. Therefore, the application of an equation similar to the Einstein equation $$U_2(t) = U_2(0) \exp\left(D_1 \frac{h v_d}{kT} t\right) \qquad (5)$$

is justified.

Here Di is the energy dissipation coefficient characterizing spontaneous radiation, having dimensions $s^{-1}$, $v_d$ is the frequency of the photon stimulating the radiation of energy accumulated in the domain of destruction, k is the Boltzmann constant, T is the absolute temperature. However, such a conclusion is provable via experimental verification. In connection with this, additional equations are proposed.

Basic Equations of Destruction Mechanics

The absence of a quantum theory of strength and destruction led to the fact that the physical measurable parameters, on the basis of which equations can be proposed, are determined for the first time. Modern technical laboratories use instruments and methods for studying dynamic processes at the atomic, molecular, and nano level. Quantum mechanics allows the use of material parameters based on the measurement of spontaneous emission of atoms during operation. One of these parameters is wear due to the ratio of the number of morbid $N_m$ atoms to the number of normal $N_n$ atoms at each stage of the operation of an element of structure or device.

The total binding energy of a local group of atoms of an element at the initial time t=0 is due to the energy state of normal atoms. The experiment shows that the induced radiation occurs in a narrow frequency interval, at which the frequency, phase, polarization and direction of the photons emitted induced, coincide with the parameters of the photon that stimulated the radiation. In this regard, we can restrict by one chemical element.

The energy of a local group of atoms, an element before the start of operation t=$t_0$, due to the energy of the bond $\varepsilon_b = h v_b$ of atoms, is equal to $$U_1(v, t_0) = \varepsilon_b N_n(t_0) \qquad (6),$$

where $N_n(t_0)$ is the number of normal atoms.

The energy of the morbid atoms at this time is equal to $$U_2(v, t_0) = \varepsilon_m N_m(t_0) \qquad (7),$$

where $\varepsilon_m = h v_m$ is the energy of the morbid atom, $N_m(t_0)$ is the number of atoms. The number of morbid atoms is extremely small, $$N_m \ll N_n.$$

Experimental studies performed by S. P. Zhurkov showed that long-term strength is well described by the exponent Experimental studies performed by S. P. Zhurkov showed that long-term strength is well described by the exponent $$\tau_p = \tau_0 \exp[(U_0 - \gamma \sigma)/RT] \qquad (8)$$

for various crystalline and amorphous bodies. Here $\tau_0$ is a constant, numerically close to the period of thermal oscillations, $U_0$ is the destruction energy, close to the sublimation energy, $\gamma$ is a structure coefficient, having the dimension of volume, $\sigma$-mechanical stress, R is gas constant, T is absolute temperature.

Attempts to improve Zhurkov's formula were made repeatedly, but without success, because the authors remained in the position of classical mechanics, which does not allow one to understand the physical meaning of the structural coefficient, which has the dimension of volume.

The inventor proposes to treat this coefficient as the volume occupied by morbid atoms, i.e. the volume of destruction domain $V_d$. In this case, the Zhurkov's formula will be represented as follows:

$$\tau_p = D^{-1} e^{\frac{U_s - \sigma V_d}{kT}}, \qquad (9)$$

where D is a parameter similar to the coefficients in the Einstein's theory of spontaneous and stimulated emission, $U_s$ is the sublimation energy. This allows us to postulate that the number of morbid atoms grows exponentially.

This allows us to postulate that the number of morbid atoms grows exponentially $$N_m(t) = N_m(t_0) \exp(A/DkT) - N_m(t_0) \exp(U_2/t_c DkT) \qquad (10)$$

Here $A = U_2/t$ is the energy accumulation rate, B−DkT is its dissipation rate, $\Gamma = A/B$ is the degree of wear.

The safe operation time tc is set during design. Based on this, the degree of wear of wear and accumulated energy is estimated, $\ln N_m(t_c) - \ln N_m(0) = A/Dk_B T = U_2/t_c Dk_B T$. $\ln N_m(t_c) - \ln N_m(0) = A/DkT = U_2/t_c DkT$ Neglecting the number of morbid atoms at the initial moment, we get:

$$U_2(t_c)/DkT = t_c \ln N_m(t_c) \qquad (11).$$

However, the determination of the ultimate value of the energy $U_2''(t_u)$, which leads to destruction, is possible only by experimental research, but the experiment should answer the question: when should the operation be terminated so it will be not too early, but not too late.

The theory cannot answer this question, for an atomic reaction can be stimulated even by solar radiation, especially during a solar storm.

Determining the moment of termination of the facility or device becomes so important that such a decision must be justified by a comprehensive experimental study, providing a computer program with all the data to determine when an emergency stop.

Ways to Implementation the Method

Maxwell's work [J. C. Maxwell, III. On the Equilibrium of Elastic Solids, (1850) pp. 31-'74, The Scientific Papers of James Clerk Maxwell, Edited by W. D. NIVEN, M. A., F. R. S.] still remains the only theory in mechanics, the equations in which are derived on the basis of experiment and suggested experimental methods for their use.

Maxwell investigated the relationship between the pressure at various points in the body under mechanical action and the only optical response known at that time as the interference of polarized rays, putting the foundations of photoelasticity. He proposed the equation $$I = \omega \cdot \frac{Mb}{2\pi r^2}, \quad (12)$$

which relates the optical response I to the moment of force M, which displaces the upper surface of the hollow cylinder relative to the fixed inner surface by an angle δθ. Here b is the length of the cylinder, r is the distance from the axis of the cylinder to any point of the solid part of the cylinder. The article concludes with the conviction that the study of the relationship between mechanical action and optical response for various materials might lead to a more complete theory of double refraction, and extend our knowledge of the laws of optics. The creation of quantum electrodynamics, which is the most accurate physical theory, confirmed Maxwell's prediction, but it is not used to solve the problems of strength and destruction.

Photoelasticity is used in strength mechanics as the main argument for the introduction of stress intensity factors.

This conclusion is erroneous, because birefringence is due to the anisotropy of atoms or molecules associated with a change in orbital or magnetic quantum numbers, which does not lead to a change in strength properties or destruction. Electro-optical and magneto-optic effects, leading to birefringence, were confirmed by Maxwell's prediction. He discovered an effect called dynamo-optic.

The use of the photoelasticity method simultaneously with the method proposed in the invention will help clarify the role of luminous regions and establish the coordinates of the domains of destruction using another Maxwell equation proposed in this paper:

$$\Psi(x, y) = I \frac{1}{z} = \omega(q - p) \frac{1}{z}, \quad (13)$$

where I is the difference of retardation of the oppositely polarized rays, and q and p the pressures in the principal axes at any point, z being the thickness of the plate.

The equations proposed by Maxwell for the bending of rods were tested by him experimentally on samples of iron, brass, and glass with an accuracy of a fourth sign.

The X-ray radiation that occurs when a steel bar is destroyed is shown in FIG. 1D. This experiment, performed by the author of the proposed method, confirmed the idea of Maxwell, formulated by him in a letter to Thomson (Lord Kelvin).

The theoretical prediction of quantum effects and experimental confirmation allows them to be used for experimental evaluation of the ultimate value $U_2{''}(t_u)$, which is the main parameter on the basis of which the possibility of preventing catastrophic destruction is based. This allows the method of assessing the potential energy of destruction of the elements of structure or device to be briefly called MAPED.

Spontaneous emission of morbid atoms is not the only response to deformation. Additional information about atomic reactions in the deformed material during operation is provided by luminescence; in experimental studies, additional resonance methods are used, for example, gamma resonance, stimulated Brillouin scattering, X-ray diffraction, X-ray spectroscopy, etc.

The implementation of the proposed method consists in establishing a functional relationship between the radiation intensity and parameters characterizing an external effect, for calculating the accumulated energy and the rate of its accumulation with the maximum accuracy until a crack appears. A characteristic feature of the method is that it uses only measured parameters, a crack forms in millionths of a second, and no radiation is observed at the moment of the formation of a crack.

For example, one has to research:
$I_e h(v,t) = F_1(\sigma N)$ until cracks appear under cyclic deformation of stretching, bending, torsion, or shear, where σ is stress, N is the number of external influences;
or $I_e(v,t) = F_2(Sh_1)$ when an indenter is immersed, where S is the indenter footprint, $h_1$ is the immersion depth;
the connection $U_2(v,t) = F_3[I_c(v,t)]$ when a crack appears is established only in an experimental study; in practice, an extremely admissible value of energy $U_{2\ ex}(v, t_{ex}) = U_2{''}(t_u)$, is used, at which the operation is terminated and the element is replaced.
an accurate definition of tex prevents catastrophe and provides the ability to use the entire resource.

Quantum electrodynamics is an accurate physical theory, on the basis of which processes of interaction of atoms can be explained. Every interaction of atoms is due by the exchange of electrons and photons.

The implementation of the method is based on a theoretical assessment of the potential energy, the accumulation of which is due to the deformation. The equations used for the calculations contain only the measured physical parameters characterizing the atomic reaction, and the proportionality coefficients found during experimental studies of the material.

The spectrum of electromagnetic radiation is the only objective characteristic of the energy state of the atom. The frequency of electromagnetic radiation is measured with such an accuracy that is not available for measuring other parameters.

The induced radiation is due to the quantum mechanical properties of local groups of atoms. It occurs at a certain concentration of metastable atoms in a region, for example, in a grain or in a twin, which is a resonator having two parallel boundaries on which electromagnetic waves are reflected.

It is particularly important to note that the amplification of electromagnetic radiation can occur when a small number of atoms are in the upper state in the local area, unlike in a laser. It is only important that there are more of them at the excited level than at the lower level. Energy absorption will be accompanied by breaking the bond between the number of atoms at which further exploitation is possible. This may be enough for high-power induced radiation to occur, but with little energy. This phenomenon is called in mechanics tolerance to damage, hidden or subcritical crack.

A similar phenomenon is possible with high concentration quenching of luminescence or under the influence of impurities.

These phenomena allow reducing the rate of accumulation the energy, increase the rate of dissipation by changing the composition of the material, the shape of the product and stimulating the safe radiation from the destruction domain.

The safety of structures and devices cannot be achieved without state standards, which must be changed due to the successes of science and new discoveries. US standards are becoming the basis of other countries' standards or are used unchanged, but a number of standards, such as E399, are based on the use of stress intensity factors. Such standards are erroneous. The basis of the new standards should be the experiments described in the present invention or similar to it.

The implementation of the method does not present fundamental difficulties in any technical field, for the experimental equipment for studying the S-N curves is supplemented by devices for studying electromagnetic, including X-ray, radiation, transmission, storage and analysis of information. This change turns the S-N method into the U-N curve method. This is the second step to preventing the man-made disasters.

Comparative Analysis of the Method Proposed in the Invention with Other

Example No. 1. A titanium alloy compressor disc with 12 bolts holes was tested in accordance with the FASTRAN II program [W. Z. Zhuang et al., ICAS-98-5, 2, 3, A98-3162 (1998)]. The first crack on the edge of one of the holes was found after testing 8533 rpm. The disk was destroyed into five fragments after testing at the speed of 9462 rpm. The photo above demonstrates four points in which three cracks meet (or diverge) and the fact that the crack discovered first grew in one and the opposite direction. The main damage didn't occur in the area of the holes, the thickness of the metal in which is 3 mm, but in four points along the rim, which is 15 mm thick. This fact allows us to conclude that the cause of the destruction was the distribution of energy, but not stresses, as the authors believe.

FIG. 20 confirms this conclusion. The graph above characterizes the relationship between the crack length and the kinetic energy of a rotating disk. The proportionality ratio C is used instead of the moment of inertia. The maximum crack length is lowered to show a parabola.

One of the causes of erosion, corrosion, and even destruction, turbine blades, propellers is an increase in electron density on the outer surface caused by centrifugal force. Increased electron density leads to the formation of AM morbid atoms, the bond between which is weakened. This defect is eliminated by creating an electrostatic field of counter-polarity.

Example No. 2. The crack to the right of the A40 AET rivet was discovered when examining a panel of a riveting joint with an overlap of the fuselage of a Boeing 727-232 (B727) [See: B. R. Mosinyi, Aircraft Fuselage Damage Assessment In-Service Aircraft Fuselage Department, Drexel University (2007)] earlier than the crack to the left A40 FWD. The crack on the right, according to Griffiths theory, will reach the critical value earlier than the crack on the left, but Mosinyi received one solution of the NASGRO equation for two cracks.

Analysis of the processes of formation of these cracks was performed by the inventor using the equation relating changes in energy $\Delta U_2$ with metal thickness hi, binding energy $\varepsilon_b$, lattice constant a, crack growth rate $$\frac{\Delta l}{\Delta N}$$

$$\Delta U_2 = h_{1 \varepsilon b} a^{-2} \frac{\Delta l}{\Delta N}. \tag{14}$$

Note that the crack growth rate (measured parameter) in the equations of fracture mechanics, including NASGRO, is used as a function of stress intensity factors and other parameters that cannot be measured.

The use of equation (14) for analyzing the A40 AET and A40 FWD crack formation processes is demonstrated in FIG. 21 in the form of graphs based on the tables given Mosinyi, and the parameters of the fuselage metal.

The maximums on the graphs indicate at the time when the energy was emitted by some atoms, was absorbed by other atoms, between which the bond was broken; minima correspond to the period of energy accumulation. Particular attention should be paid to the minimum at N=141229 on the A40 FWD chart, which is actually located below the limits of the chart. The stored energy has a negative value of 12882 nanojoules. This minimum on the graph coincided with the maximum of A40 AET, whose energy of 5336 nanojoules was radiated. The coincidence is conditional, since the extension of the crack occurred in a millionth of a second during the experiment, which lasted 1176 hours.

Example No.3 Cracks growing towards each other were observed on nanofilms when irradiated with hydrogen and helium ions, when studying the riveted joint of the Boeing 727-232 (B727) fuselage and on the surface of the earth. Crack length from a few nanometers to tens of kilometers indicates that the nucleation and growth of cracks caused by a single mechanism which is independent of the size of the object. This mechanism is due to the atomic reaction, in which the accumulation and dissipation of energy occurs and its induced radiation.

Two pairs of such cracks A22Right-A23Left and A23 Right-A24Left was found when examining the Boeing 727-232 (B727) fuselage riveted panel, [See: A. Ahmed, Initiation and Growth of Multiple-Site Damage in the Riveted Lap Joint of a Curved Stiffened Fuselage Panel: An Experimental and Analytical Study, Thesis Submitted to the Faculty of Drexel University 2007, pp.328.] The analysis of these cracks was limited to a statement of the fact.

The tables in the cited paper were used by the inventor to analyze processes using equation (14). The graph of one of the cracks is shown in FIG. 22. Comparative analysis of the volume of information and its quality using equations in which the crack length l is used as a function of the number of cycles and other parameters, and equation (14) shows that a smooth crack growth does not represent the dynamic processes leading to destruction.

The minima characterizing the time of energy accumulation are replaced by maxima indicating the moment of induced radiation. Note that even though the measurements of crack elongation were carried out after hundreds of hours, the intervals between the peaks differ by no more than 10%.

However, the most important difference between MAPED and other methods is the ability to analyze not only the accumulated energy, but also the accumulation rate, which slowed down by 5 nJ/cycle between 13 and 14 measurements, while it increased to 13.6 nJ between 14 and 15 nJ/cycle.

Analysis the Man-Made Disasters Causes

Problem No. 1. The railway accident (Hatfield, UK, 2000) is explained by the fact that the rail under the train broke into 300 fragments on a 35-meter section. Cracks were found on another 50-meter section. This happened despite the fact that, shortly before the accident, the rail was tested with ultrasound, but no defects were found. The cause of the catastrophe is called "rolling contact fatigue" (defined as multiple surface-breaking cracks). However, the nature of fatigue can be explained using quantum mechanics.

The distinctive features of the analysis of this catastrophe are: the impossibility of finding the cause, multiple homogeneous gaps in which the structure of the fracture surface of the fragments is different, as can be seen in the photos given in the first report published in October 2000. The surface of the fragment, characteristic of plastic fracture, was subjected to intensive corrosion, while the surface of the fragment, characteristic of brittle fracture, remained brilliant, as can be seen in the photographs published in the second report six years later.

Problem No. 2. The crash of the river bridge 1-35 W across Mississippi (USA, 2007) was due to the rupture of eight rivet holes of the U10 gusset 40 years after its opening. The cause of the disaster, as defined by the State Commission, is a design error, which is that the thickness of the leaflet is insufficient. The conclusion is made on the basis of the analysis performed using the finite element method.

A photo of the U10 Gusset plate taken after extracting a fragment from water, not published in a report, shows that the nature of the breakdown of four even-riveted holes differs from the breakage of four odd holes. The rupture line passed through the centers of all the holes, but the shape of the even holes remained unbroken and the edges shiny, while the metal near the odd holes was severely damaged and subject to intense corrosion, just as happened with rail fragments.

Coincidence is natural, since dark areas have been observed in the study of rail defects more than once, but the finite element method is purely mathematical, no containing physical parameters. This method did not reveal the damage that occurred during operation. The method proposed by the invention makes it possible to record the intensity of the radiation of energy, which is the main physical parameter, and the position of the radiating objects in space. These physical parameters are used in a computer program to calculate the accumulated energy and the rate of its accumulation.

Technological Process Control Capabilities

Problem No. 3. Quality control riveting holes of the fuselage and the wings of the aircraft The study of defects arising in the rivet holes of the aircraft wings, made using an external source of X-rays [See J. Xu et al, Automatic X-ray Crack Inspection for Aircraft Wing Fastener Holes, 2nd Int. Symposium on NDT in Aerospace 2010 Mo.5.A.4] revealed the damage of the holes edges, just as it was obtained using MAPED, but did not detect hidden defects between them.

Two plates of aluminum alloy imitated a rivet joint with an overlap of the aircraft fuselage. Eighteen holes were drilled in this joint. One hole was intentionally damaged. 14 frames recorded the destruction of the hole and 11 defects between the holes. Studies of the fuselage have shown that in these places pitting defects of corrosion and cracks grow, growing towards each other.

The study of defects arising in the rivet holes of the aircraft wings, made using an external source of X-rays revealed the damage of the holes edges, just as it was obtained using MAPED, but did not detect hidden defects between them.

Eleven frames were obtained when installing 18 rivets, at which one defect was fixed, made intentionally.

Problem No. 4. Hot and cold chinks in cast aluminum

An analysis of the publications showed that attempts to understand the mechanism of the formation of hot and cold cracks in cast aluminum, while remaining in the position of classical mechanics, and creating a computer program to prevent them, were unsuccessful.

The experimental study, made by the inventor, of hot and cold cracks formation in silumin and aluminum alloy 7075-T651 during solidification of the ingot and cooling of the samples at a temperature gradient of 120 K/cm showed that the mechanism of cracking is identical. A computer program for predicting the occurrence of hot or cold cracks is created on the basis of measurements the intensity of spontaneous X-ray radiation and luminescence intensity caused by radiation in various areas of the cooling melt or ingot.

Problem No.5 High-entropy alloys

High-entropy alloys consisting of five to six chemical elements, the concentration of each of which is from 5 to 35%, have high hardness, corrosion resistance, heat resistance, thermal and mechanical wear resistance. It is assumed that the unique properties of these materials are due to the successful combination of ductility and brittleness. The authors of the publications, offering different compositions, try to establish the natural influence of any physical parameter on the alloy property. The number of combinations is unlimited, but the trial and error method are not effective.

The electron backscattering method is one of the most effective for studying high-entropy alloys using electron microscopes. The study of Fe-30Mn-10Co-10Cr-0.5C (at. %). Alloy grains. [See: M. Wang et al., Acta Materialia 147 (2018) 236-146], showed that all metals form local regions whose color is different. This allows you to determine the chemical element whose atoms form a destruction domain and replace it with another analog.

The method of backscattering of electrons, like methods based on transmission, gives distorted information in cases where the material under study is deformed, because atoms in this case are subject to two electromagnetic effects. This distortion is especially great when the energy of a photon intended for research is comparable or exceeds the photon energy, which is the cause for the atomic reaction.

The method proposed in this invention is free from this disadvantage.

The fact that atoms of a single chemical element form a local nano-sized area in the grain makes it possible to experimentally estimate to what extent this concentration affects the rate of energy accumulation and its dissipation and change it to extend the time of safe operation.

Theoretical and experimental methods developed to improve the quality of a laser help to develop methods for reducing the rate of energy accumulation and increasing the rate of dissipation. Exact determination of the frequency of the stimulating signal allows you to stimulate the radiation before it becomes dangerous.

Measuring the Intensity of Spontane Radiation

Measurement of the intensity of spontaneous electromagnetic radiation of a monitored object (MO) is shown in FIG. 22. The part of the object, the damage of which leads to a catastrophe, is called the structural element (SE). For example, the self-loosening of the nuts on the point 2182 A caused a catastrophe (Potters Bar, UK, 2002). The number of structural elements n is due to the safety of MO operation. The signal from the sensor, for example, Sen 1, enters the converter Con 1 and is converted, encoded and transmitted to the TR 1 transmitter, then by wires or without them transferred to the computer (COMP).

Signal coding eliminates the possibility of unwanted interference and unwanted reading.

The computer program analyzes the data obtained, estimates the accumulated energy, its accumulation rate, compares with the limit values obtained as a result of the experimental study, and the control convector (CC), in case of danger, through the TR 2 transceiver and the RS receiver using wires or through air is transmitted an alarm and shutdown alarm (ASD). The limit values may be referred to as "critical values." The measured value of accumulated energy (which may be expressed in various ways using various proxies, including intensity) may determined by the computer program to be indicative of potential structural failure in various ways, such as by reaching a threshold relative to the critical value, accelerating at a threshold rate toward the critical value, or in other ways. The threshold or other parameters for determining whether measurements are indicative of potential catastrophic failure may be dependent on context and may be determined experimentally. For example, statistical analysis can be performed to set the parameters such that measurements are determined to be indicative of potential structural failure if there is a certain probability of failure based on experimental measurement, where the probability can be set dependent on context (e.g., the potential for disaster). For example, the probability may be low in such cases where structural failure can lead to catastrophe (e.g., for an airplane) and higher when structural failure has less potential for catastrophe (e.g., in contexts where there is little chance for harm to humans or large-scale property damage). The parameters may also be set based on the availability of redundant systems that operate in case of failure, and based on other factors.

The universality of the method proposed in the invention is due to the possibility of continuous non-destructive remote monitoring of atomic processes in all objects, regardless of their size, composition, structure, nature of external influences.

The main objective of the invention is to predict the critical state of the object under study and to prevent its destruction. The method is applicable to both experimental studies and facilities that are operated.

The maximum effect from the implementation of the MAPED will become possible when a functional connection between the areas emitting energy due to the deformation and the areas accumulating it is established. The search for such a connection is possible not only on laboratory models, but also on real technical objects.

Numerous experiments, the purpose of which is shown in the table above, allow us to propose a program of experimental studies for the implementation of the proposed method.

Problem No. 6. The next panel of the Boeing 727-232 (B727) fuselage is tested on the same experimental equipment as the previous ones, but using a different program. Electromagnetic radiation that occurs in the process of deformation, is fixed on the film and digital sensors. The signals from sensors are converted and transmitted by wire or without them to a computer containing a program for measuring the intensity, storing information and analyzing it. The sensors, in an embodiment, are placed on structures of the plane using adhesive stickers (e.g., stickers as part of logos and other decorative aspects of the exterior of the plane) to reduce air resistance caused by the stickers.

The nature of the test samples varies to reduce their number, reduce time and increase efficiency. For example, the number of tests of the fuselage panel and the number of cycles before a crack appears decreases due to an increase in the stress.

Refusing to use the S-N method does not exclude the possibility of using the results obtained by this method. The tables obtained during the study can be used to clarify the time of safe operation, residual life and degree of wear. Only on the basis of experimental studies can the extent to which formula 12 b gives more accurate results than formula 12 a, but note that formula 12 b can be replaced by formula $$\tau_p = D^{-1} e^{\frac{U_A - V_d \sigma^2}{EkT}} \text{ or} \tag{12c}$$

$$\tau_p = D^{-1} e^{\frac{U_A - V_d \sigma^2}{GkT}}, \tag{12d}$$

sproposed by the inventor.

Here, E is the modulus of elasticity, G is the shear modulus.

The volume of the domain of destruction can be calculated on the basis of experimental data, if they are sufficient for this.

Problem number 7.

Find the volume Va of the domain of destruction.

We use the experimental study which are given by Atre et al. [W. S. Atre et al. Finite Element Simulation of Riveting Process and Fatigue Lives, DOT/FAA/AR-07/56, V.3, 2009, pp. 166]

Initial data:
metal M
crack length l
crack depth $h_1$
bond energy $\varepsilon_b$
lattice constant a
spontaneous emission photon frequency v.

Solution

The sequence of mathematical transformations is given below.

The crack area is S–$lh_1$, the number of cells on it is $$n = \frac{S}{a^2} = \frac{lh_1}{a^2},$$

the energy radiated to form a crack is $$U_2 = \frac{lh_1}{a^2} \varepsilon_b,$$

the number or morma atoms emit her:

$$N_m = \frac{lh_1}{a^2} \cdot \frac{\varepsilon_b}{hv}.$$

If there is one morbid atom in each unit cell, then the total volume is $$V_d = \frac{lh_1}{a^2} \cdot \frac{a^3 \varepsilon_b}{hv} = alh_1 \frac{\varepsilon_b}{hv}.$$

A numerical solution of the problem can be obtained after experimentally determining the frequency of the photon of spontaneous radiation.

The main task of the experimental study is to find the relationship between the accumulated energy and the intensity of spontaneous radiation, which is measured experimentally by $N_m = CI_e(v,t)$.

Problem number 8. Preventing railway disasters

The safety of the operation of the rail track today is based on the use of mainly two non-destructive control methods: ultrasonic and magneto dynamic, the main disadvantage of which is the fact that they are designed to search and analyze cracks and other defects that are harbingers of catastrophic destruction, but not the cause. The wavelength of eddy currents and ultrasound, the minimum value of which is 1 millimeter, does not allow to detect micron cracks, while X-ray radiation from the material allows you to set the moment of nucleation of the nano-sized crack.

The ability to implement the method is due to the use of electromagnetic, including X-ray, radiation caused by the deformation, which is measured with maximum accuracy, data is transmitted by wire or without them at maximum speed using modern communication systems, including space.

It is known that the cause of a train accident is rail damage that occurs not only under the locomotive and wagons or after passing the train, but even before it. The inventor witnessed the prevention of a catastrophe that could have occurred on Aug. 31, 1978 at Grebyonka station (Ukraine), when the rails curved in front of the passenger train, moving at 15 m/s. Locomotive was stopped five meters before damage.

The photos shown in FIGS. 12A-12L were taken when the locomotive stopped three meters from the film. Consequently, radiation occurred before the rail subjected to intense deformation.

FIGS. 11C-11P illustrate the energetic connection between the rails, while FIGS. 11A, 11B, 11Q, and 11R illustrate the displacement of rail fastenings.

Experimental research indicates that the energy radiated in one area as a result of mechanical action spreads in the rail to a considerable distance in the form of electromagnetic waves, causing acoustic waves in its path.

The fact that the driver, seeing the movement of the rails, managed to stop the train, allows predicting the formation of dangerous defects before approaching them.

The intensity of the radiation recorded in all the photos shown in FIGS. 12A-12L indicate that such radiation will be observed from a more distant source.

Problem number 8.1. Rail testing using locomotive, control experiment

An experimental test of this hypothesis was performed at the Northwest Railway

Museum (Snoqualmie, WA) on ½ mile (800 m) railway track. The experimental scheme is shown in FIG. 24.

Two containers with photographic film were placed simultaneously on the surface of the rail head and the foot in the interval $A_{x0}$. Locomotive, located at point xi at a distance of 20 feet, began to move towards point B, but stopped at point $x_d$, located at a distance of ¼ mile from point $x_1$. The containers with the film were replaced with similar ones, after which the locomotive began to move to the point Xf, located at a distance of ¼ mile (400 m) from the point $x_1$. The containers were replaced a second time after the locomotive reached point $x_n$ and began braking. The seventh and eighth films fixed the start in the opposite direction for 15 seconds.

The results of the experiment in which 132 photographs were taken illustrate 24 (three from each film) shown in FIG. 19. Analysis of photographs shows that the film recorded radiation from a distance of ½ mile. This conclusion is the main argument for preventing a catastrophe. We see in FIGS. 19B and 19C "Fan-like" radiation; thin lines and wide areas similar to the crack shown in FIGS. 19A, 19N, 19M, 19Q, 19S, and 19W, etc.

At the same time, we are witnessing a paradoxical phenomenon that requires an explanation. Repeated photographing of different objects in one frame distorts the image, but this did not happen, because the image is clear, like at a single blow. This fact is due to the high speed of the electromagnetic signal and the constant distance between the wheels of the locomotive and the synchronous effect.

Rail track damage is monitored using a device that measures the intensity of electromagnetic, including X-ray, radiation due to deformation, and/or the intensity of luminescence excited by this radiation, transmit data using radio signals to the spacecraft, which determines the coordinates of a point from which radiation occurred, and relays this information to the server, which analyzes, stores this information and makes decisions. The server may be located locally (e.g., on the train) or remotely, accessible over a wide area network, such as the Internet and/or a cellular network. Decisions may be, for instance, to alert an engineer (driver), transmit signals to cause brakes to engage, and/or perform other mitigating actions, which may be programmed to occur according to different contexts, which may be based on the level of danger encountered and/or potential catastrophes that feasibly could occur.

The device unit containing the sensors for measuring the intensity I is located as close as possible to the side surface of the rail at the point of contact of the locomotive wheel and rail, but without touching it so that it is not damaged during movement. The unit is rigidly attached to the frame of the locomotive. Two sensors are placed vertically through the contact at a maximum distance from each other from the rail head along the web, including the foot, the other two sensors are located on either side of the vertical line.

The possibility of positioning the sensors above the radiation surface has been tested experimentally for two cases. The container with the film was fixed at two extreme points under the 6 mm thick steel plate located horizontally, so that the central part of the container was 26 mm away from the plate; three blows with the tip of the ax were applied at different points on the upper surface. 12 photographs were taken throughout the film. Three photos of the middle section are shown in FIGS. 17G-17I.

A similar plate and container were arranged vertically. The impacts with an ax and a hammer were applied to the butt surface. 10 photos were recorded, three photos of the middle part of the film are shown in FIGS. 17J-17L.

22 of these photographs show that the radiation is spontaneous and its intensity can be measured on the horizontal and vertical surfaces of the rail with repeated exposure.

Problem number 8.2. Research of radiation sources and determination of their intensity In one example embodiment, the minimum number of sensors is eight. They are located four to the left and four right of the locomotive to scan each rail at four points simultaneously. Denote the sensors located in the block to the left $\alpha$ and $\beta$, while the right are $\gamma$ and $\delta$.

Non-framed photographic films in containers, opaque to visible and ultraviolet rays, are placed on the vertical (web) and horizontal (foot) surface of the rail between points $x_0$ and $x_1$ in front of the locomotive.

Let me denote the intensity measured by the sensors in the horizontal plane on the left $I_{\alpha h}(x) I_{\beta h}(x)$, and $I_{\gamma h}(x)$, $I_{\delta h}(x)$ on the right and the vertical plane on the left $I_{\alpha v}(x)$, $I_{\beta v}(x)$ and $I_{\gamma\nu}(x)$, $I_{\delta\nu}(x)$ on the right respectively. The peculiarity of the method designed to prevent fracture allows determination of the fracture energy only in an experimental study. This predetermines the fact that the most effective combination of using sensors can be proposed only on the basis of an experiment.

Simultaneously with the four-sensor unit, a three-sensor unit is tested, scanning the surface of the head, web and foot. The method does not limit the number of options, but the advantage sets the experiment.

Experiment No. 8.1. The locomotive is located at point A to begin research. It moves forward until the rear wheels pass over the films. Sensors scan rails previously undeformed by the locomotive, while photographic films record radiation. Films are removed and the locomotive returns. New films are located just like before. Note that various embodiments may use digital imaging techniques to avoid the use of film and improve practicality. Generally, photographic sensors may be used in place of films and data may be obtained digitally.

Experiment No 8. 2. The locomotive passes over the films and stops. Films are replaced by sensors on the rails, the number and place of which is determined by the experimenter.

Such an arrangement of sensors and photographic films allows obtaining maximum information about the sources of radiation of energy for comparing the results of research obtained by photographic and sensory methods during the initial study.

Figure 14A:
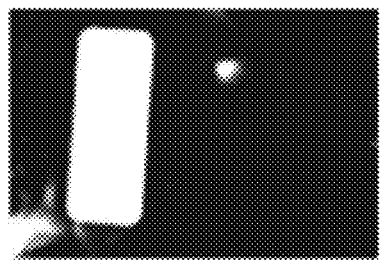
Figure 14B:
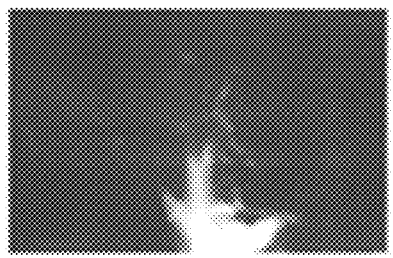
Figure 14C:
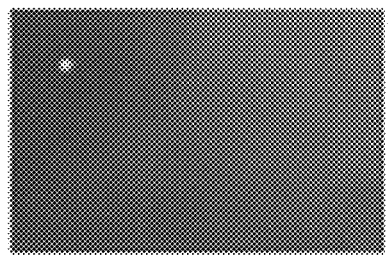
Figure 14D:
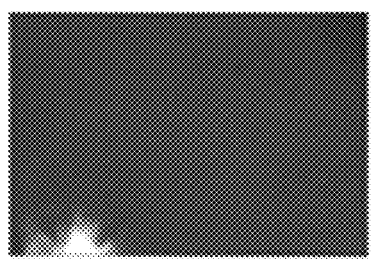
Figure 14E:
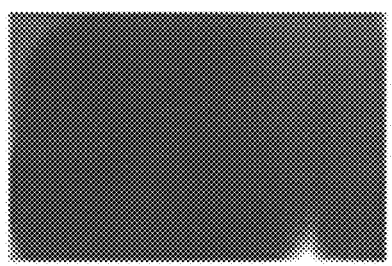
Figure 14F:
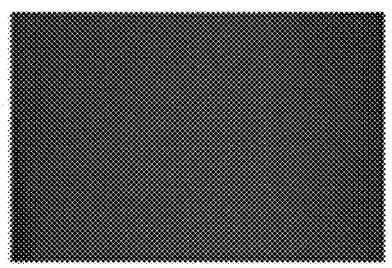
Figure 14G:
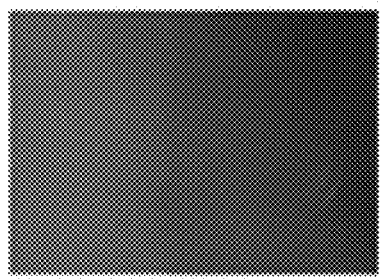
Figure 14H:
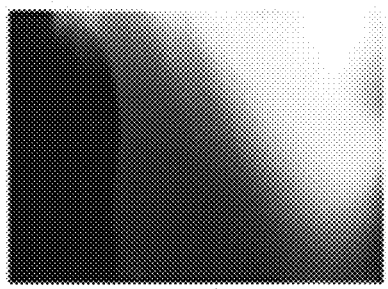
Figure 14I:
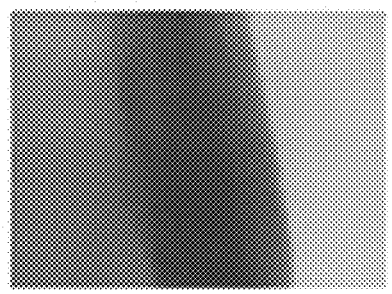
Figure 14J:
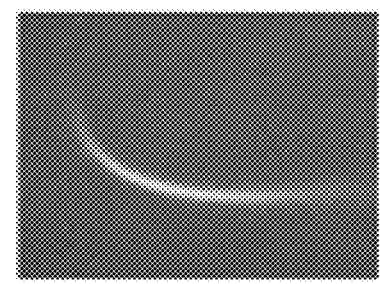
Figure 14K:
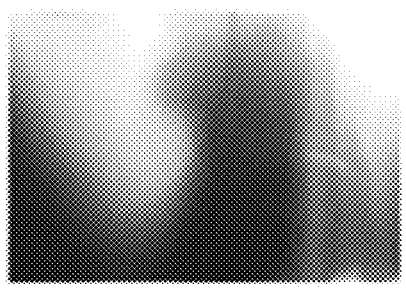
Figure 14L:
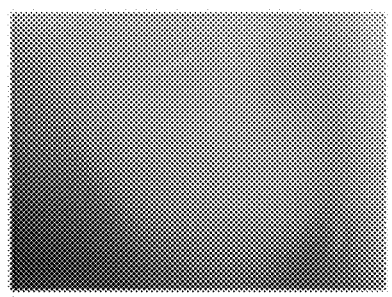

Of particular interest are both energy-emitting and dark areas similar to those recorded in photos: FIGS. 12H-12L; FIGS. 14G-14I; and FIGS. 15A, 15J, and 15K.

FIGS. 11A-11R show that the energy radiated during the deformation of one rail is transferred to another. Neglect of this energy without special experimental evidence is unacceptable.

Measuring the intensity of electromagnetic radiation at eight points on the rails allow to reveals sources of energy whose stimulated emission can lead to the formation of dangerous defects, using the fact that the signal intensity at each point of the rail is related to the intensity of radiation at other points where all wheels of the locomotive impact on rails.

However, FIGS. 12-15 show that the total impact of the wheels is accompanied by the formation of a limited number of local luminous and dark areas. The continuous luminous region was formed only on the railway sleeper, as shown in FIGS. 11A-11R.

This fact indicates the possibility of estimating the accumulated energy using a number of equations.

A system of possible equations for experimental studies based on data from eight sensors is proposed:

1.1. $U_{\alpha h=}\Psi I_{\alpha\nu}(x)$, 1.2. $U_{\beta\nu=}\Psi I_{\beta\nu}(x)$, 1.3. $U_{\gamma\nu=}\Psi I_{\gamma\nu}(x)$ 1.4. $U_{\delta\nu=}\Psi_{\delta\nu}(x)$, 1.5. $U_{\alpha h=}\Psi I_{\alpha h}(x)$, 1.6. $U_{\beta h=}\Psi I_{\beta h}(x)$, 1.7. $U_{\gamma h=}\Psi I_{\gamma h}(x)$, 1.8. $U_{\delta h=}\Psi I_{\delta h}(x)$.

Here $\Psi$ is the coefficient of proportionality.

The number of equations and combinations of them is increasing to study the changes caused by the repeated effects of the wheels of the locomotive, the cars following it and repeated testing.

The distance $x_1$-$x_n$, after which the intensity of the pulses emitted at the locomotive location is insufficient for identification by fixed sensors, is used to establish the sensors at point B, is used to determine the position of the symmetric point B and the similar arrangement of the sensors.

The intensity of the signals as the locomotive moves from point xn to point B increases. The experimental section A↔B is used in the forward and reverse direction the required number of times.

Thus, the experimenter receives information on the processes of accumulation and radiation of energy throughout the AB section using the non-destructive method for the time that the locomotive passes from point A to point B.

The differentiation of hazardous and safe areas is of paramount importance.

Dangerous areas are those in which energy is accumulated. Such a region is detected by an increase in the intensity of spontaneous radiation. However, if the intensity of spontaneous radiation does not increase, this does not mean that accumulation does not occur. Therefore, additional, for example, X-ray, research is needed.

Experiments performed with the locomotive are complemented by experiments with the train, using sensors not only on the locomotive and rails, but also on the cars, including ultrasonic wagons, flaw detectors on eddy currents.

Experiment No. 8.3, designed to determine the zone of emergency braking in front of a sudden dangerous defect in the track, is performed only at the experimental railway section.

Point $x_d$ is located from point A equipped with sensors, at such a distance Ls that the locomotive is equipped with sensors also, moving from point B to point A with speed v, can stop at a safe distance from point A during emergency braking.

Impacts inflicted on rails at point A are recorded by sensors located on the rail and locomotive but with a delay $$\Delta t = \frac{L_s}{c},$$

where c is the speed of electromagnetic waves. The width of the pulse is due to the lifetime of the metastable atoms and the delayed radiation from fragments that were formed during cracking and destruction.

Comparison of the functions $U_i = \psi I_i(x)$, which characterizes the energy accumulated as a result of the impact, and $U_j = \psi I_j(x)$, which characterizes the energy recorded by the locomotive, allows you to set the distance at which the locomotive should begin emergency braking so that it is safe.

Selection of Sensors

The choice of sensors is determined by three factors: the maximum sensitivity at the frequency of the signal stimulating the emission of metastable atoms, location, shape and size. The frequency of the signal is due to the atomic number of the atom.

The sensors are located at the points of maximum absorption the stimulated radiation.

An analysis of the causes of disasters has shown that the definition of such places is particularly important. The possibility of detecting such places is shown: in the aluminum alloy in FIG. 1B; in cobblestone FIG. 1C; in the rail FIGS. 12H-12L, FIGS. 15A, 15J, and 15K; in the frame or wheels of the locomotive FIG. 16H.

Recommendations for searching for particularly dangerous defects in rails are given by the Federal Railroad Administration (FRA) [See: Track Inspector Rail Defect Reference Manual, Juley 2015, Revision 2]. However, MAPED can detect the onset of defects at an early stage. We can assume that the total impact is due to the center of gravity, since signals from different wheels come to sensors with such a small-time interval, during which the sensor cannot resolve it. But all the hypotheses can be confirmed or refuted only by experiment.

Modern companies in the United States, creating sensors and equipment for them, such as Canon Industrial Sensors and Delphi Precision Imaging, are able to ensure the implementation of the method in all sections of the industry, crop production and medicine.

Problem No. 8.3. Evaluation of critical energy

Sensors located on the rail at the point of impact send signals $U_i''=\Psi I_i''(N)$, caused by repeated impacts, which are fixed by the sensors. A computer program explores the relationship of energies in successive hits $$Z_2 = \frac{U_i^2}{U_i^1} = \frac{I_i^2(2)}{I_i^1(1)} \ldots, Z_n = \frac{U_i^n}{U_i^{n-1}} = \frac{I_i^n(N)}{I_i^{n-1}(N-1)}, \quad (15)$$

$$Z_{n+1} = \frac{U_i^{n+1}}{U_i^n} = \frac{I_i^{n+1}(N+1)}{I_i^n(n)},$$

which characterizes the ratio of the rate of accumulation of energy to the rate of its dissipation.

Changes in this relationship allows you to set the moment of formation of hidden cracks. The appearance of larger cracks is controlled additionally by ultrasound or eddy currents.

The critical energy $U_2^c$ is calculated according to the equation $$U_2^c = \varepsilon_b S a^{-2} \quad (16),$$

where $\varepsilon_b$ is the binding energy of atoms, S is the area of the formed crack, a is the crystal lattice constant.

Comparison of the functions $U_i=\Psi I_i(x)$, which characterizes the energy accumulated at the impact site, and $U_1=\psi I_1(x)$, which characterizes the energy recorded by the locomotive, allows you to set the distance at which the locomotive should begin emergency braking, which will be safe.

It should be noted that the intensity of spontaneous radiation depends on the direction. The total radiation power is estimated using the Ulbricht integration ball, in which the source is a luminescent screen surrounding the deformed body.

An important condition for the use of MAPED is the identification of luminous and dark areas in order to search for the destruction domain. One of the methods for its detection is the residual radiation of the surface of destruction. The lifetime of such atoms in the optical range is 1.6-0.3 μs. Radiation in the X-ray range is detected with the introduction of the indenter, as was confirmed by the inventor.

The decision on the practical application of the method is applied on the basis of the established State Standard.

The main advantage of MAPED compared with other methods is the objectivity of the assessment of the technical condition of structures and devices based on experimental energy measurements. The second advantage is efficiency.

For example, calculations of the strength of the rail according to GOST of Russia R 51685-2013 are performed on the basis of at least three tests, each of which includes at least five million cycles with a frequency of 5-50 Hz. Therefore, testing one rail takes from 80 to 800 hours, whereas testing two rails 1/2-mile-long each was completed in 15 minutes.

The main danger is that the standards of other countries are also based on the use of stress intensity factors, but other equations and even polynomials are proposed. State standards, equations in which are based on a hypothesis, refuted by experiment, should be replaced.

The equations obtained in the study of rails using MAPED can be applied to all extended objects, such as support beams, ropes, bridges, regardless of their shape and composition.

Problem number 9. Prediction of the earthquakes and tsunamis

Earthquakes are the object, the prevention of which remains an unresolved problem, but earlier prediction is particularly important for saving people's lives.

The table above shows that ten experimental series were performed by the inventor to show that the energy storage mechanism, the emission of which leads to earthquakes, and behind it the tsunami, does not differ from the mechanism of the metal cracking. There were investigated deformation and destruction of solids: flagstone, granite, marble and cobblestone;

deformation of steam, water and ice; deformation under the friction of aluminum on asphalt, the propagation of electromagnetic waves in the ground. 176 photos show that X-rays were observed in all cases.

Attempts to use electromagnetic radiation to predict earthquakes, including via satellites, have been made repeatedly, [See: TE. Bleier U.S. Pat. No. 6,873,265B2.] A distinctive feature of the proposed method is due to the use of X-ray radiation. The advantage of the earthquake prediction method proposed in this invention is the use of high penetrating power of X-rays, high sensitivity to all types of deformation, including internal friction and the phenomenon of self-emission transparency.

Electromagnetic radiation sensors, including those in the X-ray range, are located at any available depth of the seas and oceans, mines, and wells. Electromagnetic signals by wire or without them are transmitted to the station, including through spacecraft.

Sensors located at three points make it possible to calculate the coordinates of the radiation location of the signals. Sensors located near volcanoes in high tectonic zones make it possible to find a functional connection between small changes in X-ray intensity and earthquakes and predict them with higher accuracy.

The high penetrating power of X-rays and the high energy of atomic processes in the earthquake source and the Earth's core make it possible to fix these signals using sensors.

Problem 10. Pathology and aging of plants and living organs

The solution of these two problems has always been and remains important for humanity. Each discovery in experimental and theoretical physics is used in other natural sciences, but the discovery of galvanic electricity and the law of conservation of energy are made in medicine. X-ray radiation from plants and human organs, demonstrated in 102 photographs, expands the field of practical application of electromagnetic radiation in biology and medicine.

Discovering of self-emissive transparency in metal and wood indicates the possibility of such a mechanism in the organs of a living organism. This conclusion is based on the identity of atomic reactions, which result in the formation of luminous arcuate regions, shown for example, in 16 photographs with examples of phase transformations of water, human organs and metal deformation. Iron corrosion is accompanied by the formation of $Fe^+$ and $Fe^{3+}$ ions. G. N.

Petrakovich expressed the idea [See: Biofield Without Secrets, Moscow, "Public Benefit" 2009, pp. 305 (In Russian)], that transitions $Fe^{2+} \leftrightarrow Fe^{3+}$ electrons occur at a frequency of 6 attohertz, which is a thousand times higher than the frequency of a femtosecond laser, with the help of which self-induced transparency is observed.

The problem of energy in mitochondria is one of the most important not only in biology, but also in technology, in order to understand the mechanism of energy concentration and develop similar devices. The efficiency of mitochondria greatly exceeds the efficiency of generators created by man. The study of the energy processes of plants, animal cells and humans by a non-invasive method allows us to understand the mechanism of this phenomenon and create a similar one.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 26 is an illustrative, simplified block diagram of a computing device 2600 that can be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 26, the computing device 2600 may include one or more processors 2602 that, in embodiments, communicate with and are operatively coupled to a number of peripheral subsystems via a bus subsystem. In some embodiments, these peripheral subsystems include a storage subsystem 2606, comprising a memory subsystem 2608 and a file/disk storage subsystem 2610, one or more user interface input devices 2612, one or more user interface output devices 2614, and a network interface subsystem 2616. Such storage subsystem 2606 may be used for temporary or long-term storage of information.

In some embodiments, the bus subsystem 2604 may provide a mechanism for enabling the various components and subsystems of computing device 2600 to communicate with each other as intended. Although the bus subsystem 2604 is shown schematically as a single bus, alternative embodiments of the bus subsystem utilize multiple buses. The network interface subsystem 2616 may provide an interface to other computing devices and networks. The network interface subsystem 2616 may serve as an interface for receiving data from and transmitting data to other systems from the computing device 2600, such as sensor data, control signals (e.g., to apply brakes to a locomotive), transmitting information (e.g., message indicating warnings about structural failure, and other examples). In some embodiments, the bus subsystem 2604 is utilized for communicating data locally and/or over a network.

In some embodiments, the user interface input devices 2612 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600. In some embodiments, the one or more user interface output devices 2614 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 can be used, for example, to present user interfaces to facilitate user interaction with applications performing processes described and variations therein, when such interaction may be appropriate. For example, a display interface may provide a graphical representation of a warning to an operator, a technician, or other employee to indicate results of measurements taken in accordance with embodiments described herein and conclusions derived therefrom.

In some embodiments, the storage subsystem 2606 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 2606. These application modules or instructions can be executed by the one or more processors 2602. In various embodiments, the storage subsystem 2606 additionally provides a repository for storing data used in accordance with the present disclosure. In some embodiments, the storage subsystem 2606 comprises a memory subsystem 2608 and a file/disk storage subsystem 2610.

In embodiments, the memory subsystem 2608 includes a number of memories, such as a main random access memory (RAM) 2618 for storage of instructions and data during program execution and/or a read only memory (ROM) 2620, in which fixed instructions can be stored. In some embodiments, the file/disk storage subsystem 2610 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media. Memories of the system 2600 may be non-transitory and store instructions that are executable by one or more processors to cause the system to perform operations herein, such as applying logic to sensor data to infer conclusions to cause further operations (e.g., providing messages indicative of such conclusions, updating a graphical user interface, transmitting control signals to cause operation of another system (e.g., a brake subsystem, a warning alarm, and/or other such system). The logic can be in various forms, such as a rules engine, a decision tree, a neural network or other machine learning model, and/or other such computer-executable applications of logic to data.

In some embodiments, the computing device 2600 includes at least one local clock 2624. The at least one local clock 2624, in some embodiments, is a counter that represents the number of ticks that have transpired from a particular starting date and, in some embodiments, is located integrally within the computing device 2600. In various embodiments, the at least one local clock 2624 is used to synchronize data transfers in the processors for the computing device 2600 and the subsystems included therein at specific clock pulses and can be used to coordinate synchronous operations between the computing device 2600 and other systems in which the computing device is used. In another embodiment, the at least one local clock 2624 is a programmable interval timer. In an embodiment, the computing device 2600 may communicate with a sensor 2630. In an embodiment, the sensor 2630 may be attached to a vehicle 2626. In another embodiment, the vehicle may possess a frame 2628 to which a sensor 2630 may be mounted.

The computing device 2600 could be of any of a variety of types, including a portable computer device, tablet computer, a workstation, or any other device described below. Additionally, the computing device 2600 can include another device that, in some embodiments, can be connected to the computing device 2600 through one or more ports (e.g., USB, a headphone jack, Lightning connector, etc.). In embodiments, such a device includes a port that accepts a fiber-optic connector. Accordingly, in some embodiments, this device is that converts optical signals to electrical signals that are transmitted through the port connecting the device to the computing device 2600 for processing. Due to the ever-changing nature of computers and networks, the description of the computing device 2600 depicted in FIG. 26 is intended only as a specific example for purposes of illustrating the preferred embodiment of the device. Many other configurations having more or fewer components than the system depicted in FIG. 26 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A method, comprising:
   measuring an intensity of electromagnetic signals emitted from a structure with a sensor;
   calculating an energy stored in a portion of the structure based on the measured intensity;
   performing a comparison of the energy stored in the portion of the structure with a critical value for the structure; and
   indicating a potential failure of the structure based on the performed comparison.

2. The method of claim 1, wherein the electromagnetic signals comprise x-rays.

3. The method of claim 1, further comprising mounting the sensor to a vehicle traversing the structure.

4. The method of claim 3, wherein the vehicle comprises a locomotive or a rail car.

5. The method of claim 1, further comprising mounting the sensor to the structure.

6. The method of claim 5, wherein the structure comprises a component of an aircraft.

7. The method of claim 6, further comprising securing the sensor to the component of the aircraft by a decal of the aircraft.

8. A system, comprising:
   a sensor;
   one or more processors; and
   memory including executable instructions that, if executed by the one or more processors, cause the one or more processors to:
   measure an intensity of electromagnetic signals emitted from a structure with the sensor;
   calculate an energy stored in a portion of the structure based on the measured intensity;
   perform a comparison of the energy stored in the portion of the structure with a critical value for the structure; and
   indicate a potential failure of the structure based on the performed comparison.

9. The system of claim 8, wherein the executable instructions that cause the one or more processors to indicate the potential failure further cause the one or more processors to update a user interface.

10. The system of claim 8, wherein the executable instructions that cause the one or more processors to indicate the potential failure further cause the one or more processors to transmit a message that causes a device to brake.

11. The system of claim 10, further comprising a vehicle.

12. The system of claim 8, further comprising a vehicle onto which the sensor is mounted.

13. The system of claim 8, further comprising a vehicle having a frame onto which the sensor is mounted to monitor the structure during an operation of the vehicle.

14. A non-transitory computer-readable storage medium comprising executable instructions that, if executed by one or more processors of a computer system, cause the one or more processors to at least:
   measure an intensity of electromagnetic signals emitted from a structure with a sensor;
   calculate an energy stored in a portion of the structure based on the measured intensity;
   perform a comparison of the energy stored in the portion of the structure with a critical value for the structure; and
   indicate a potential failure of the structure based on the performed comparison.

15. The non-transitory computer-readable storage medium of claim 14, wherein the electromagnetic signals comprise x-rays.

16. The non-transitory computer-readable storage medium of claim 14, wherein the instructions cause the one or more processors to indicate the potential failure if the calculated energy stored in the portion of the structure reaches a threshold, the threshold being less than the critical value.

17. The non-transitory computer-readable storage medium of claim 14, wherein the instructions cause the one or more processors to indicate the potential failure by transmitting a signal that causes a vehicle to change an operation.

18. The non-transitory computer-readable storage medium of claim 17, wherein the signal that causes the vehicle to change the operation causes the vehicle to brake.

19. The non-transitory computer-readable storage medium of claim 14, wherein the executable instructions that cause the one or more processors to indicate the potential failure cause the one or more processors to update a user interface to present information indicative of the potential failure.

* * * * *